(12) United States Patent  
Nagano et al.

(10) Patent No.: US 10,989,929 B2  
(45) Date of Patent: Apr. 27, 2021

(54) HEAD-UP DISPLAY APPARATUS

(71) Applicant: MAXELL, LTD., Kyoto (JP)

(72) Inventors: Yuki Nagano, Kyoto (JP); Kazuomi Kaneko, Kyoto (JP); Maki Hanada, Kyoto (JP); Akio Misawa, Kyoto (JP); Kazuyuki Takizawa, Kyoto (JP)

(73) Assignee: MAXELL, LTD., Kyoto (JP)

( * ) Notice: Subject to any disclaimer, the term of this patent is extended or adjusted under 35 U.S.C. 154(b) by 98 days.

(21) Appl. No.: 16/071,523

(22) PCT Filed: Oct. 20, 2016

(86) PCT No.: PCT/JP2016/081125  
§ 371 (c)(1),  
(2) Date: Jul. 20, 2018

(87) PCT Pub. No.: WO2017/134866  
PCT Pub. Date: Aug. 10, 2017

(65) Prior Publication Data  
US 2020/0064640 A1 Feb. 27, 2020

(30) Foreign Application Priority Data

Feb. 5, 2016 (JP) .............................. JP2016-020471  
Mar. 17, 2016 (JP) .............................. JP2016-053184  
Mar. 18, 2016 (JP) .............................. JP2016-054594

(51) Int. Cl.  
*G02B 27/01* (2006.01)  
*B60K 35/00* (2006.01)

(52) U.S. Cl.  
CPC .......... *G02B 27/0179* (2013.01); *B60K 35/00* (2013.01); *G02B 27/0101* (2013.01);  
(Continued)

(58) Field of Classification Search  
CPC ............ G02B 27/0179; G02B 27/0101; G02B 2027/0185; G02B 27/01; B60K 35/00;  
(Continued)

(56) References Cited

U.S. PATENT DOCUMENTS 8,867,138 B2 10/2014 Kobayashi  
9,817,237 B2 11/2017 Kutomi  
(Continued)

FOREIGN PATENT DOCUMENTS

CN 108473054 A 8/2018  
JP 02-750330 U 6/1990  
(Continued)

OTHER PUBLICATIONS

International Search Report of PCT/JP2016/081125 dated Dec. 6, 2016.

(Continued)

*Primary Examiner* — Rodney A Butler  
(74) *Attorney, Agent, or Firm* — Mattingly & Malur, PC

(57) ABSTRACT

The head-up display apparatus includes: a vehicle information acquisition unit configured to acquire various kinds of vehicle information which can be detected by a vehicle; a controller configured to control display of a video image based on the vehicle information; a video image display configured to form the video image based on an instruction from the controller; a mirror configured to reflect the video image formed by the video image display to project onto the windshield; a mirror driver configured to change an angle of the mirror based on an instruction from the controller; and a display distance adjusting mechanism configured to adjust a display distance of the virtual image with respect to the driver, and the controller adjusts the angle of the mirror via (Continued)

the mirror driver based on the vehicle information such that the virtual image can be displayed with respect to the driver overlapped with the scenery.

11 Claims, 27 Drawing Sheets

(52) U.S. Cl.
CPC .......................... *B60K 2370/1529* (2019.05); *B60K 2370/166* (2019.05); *B60K 2370/167* (2019.05); *B60K 2370/52* (2019.05); *B60K 2370/736* (2019.05); *G02B 2027/0185* (2013.01)

(58) Field of Classification Search
CPC .......... B60K 2370/52; B60K 2370/736; B60K 2370/166; B60K 2370/167; B60K 2370/1529; H04N 5/74; G09G 5/00
See application file for complete search history.

(56) References Cited

U.S. PATENT DOCUMENTS

| | | |
|---|---|---|
| 2007/0198183 A1 | 8/2007 | Morimoto et al. |
| 2010/0164702 A1* | 7/2010 | Sasaki .................... G01B 21/22 340/438 |
| 2010/0253594 A1 | 10/2010 | Szczerba et al. |
| 2011/0134498 A1 | 6/2011 | Ohta et al. |
| 2012/0008048 A1* | 1/2012 | Sekine .................. G06T 19/006 348/566 |
| 2013/0241971 A1* | 9/2013 | Sekiya .................. G02B 26/101 345/690 |
| 2015/0331239 A1* | 11/2015 | Ando ..................... G02B 27/01 359/631 |
| 2016/0004076 A1* | 1/2016 | Matsubara ......... G02B 27/0101 345/7 |
| 2016/0048020 A1* | 2/2016 | Shih ................... G02B 27/0149 359/631 |
| 2016/0216521 A1 | 7/2016 | Yachida et al. |
| 2017/0084056 A1* | 3/2017 | Masuya ................. B60K 35/00 |
| 2017/0146803 A1* | 5/2017 | Kishigami ............... G02B 5/30 |
| 2017/0309257 A1* | 10/2017 | Akita ...................... G06T 11/60 |
| 2017/0336632 A1* | 11/2017 | Ushida ................... G02B 27/01 |
| 2018/0017792 A1* | 1/2018 | Takazawa ............. B60K 35/00 |
| 2019/0025580 A1 | 1/2019 | Nagano et al. |

FOREIGN PATENT DOCUMENTS

| | | |
|---|---|---|
| JP | 2004-168230 U | 6/2004 |
| JP | 2006-007867 A | 1/2006 |
| JP | 2007-055365 A | 3/2007 |
| JP | 2009-113710 A | 5/2009 |
| JP | 2011-64902 A | 3/2011 |
| JP | 2011-123126 A | 6/2011 |
| JP | 2011-164631 A | 8/2011 |
| JP | 2013-237320 A | 11/2013 |
| JP | 2014-010418 A | 1/2014 |
| JP | 2015-080988 A | 4/2015 |
| JP | 2015-087512 A | 5/2015 |
| JP | 2015-200770 A | 11/2015 |
| JP | 2015-202842 A | 11/2015 |
| WO | WO-9408264 A1 * | 4/1994 ......... G02B 27/0101 |
| WO | 2012/118125 A1 | 9/2012 |

OTHER PUBLICATIONS

Japanese Office Action received in corresponding Japanese Application No. 2017-565393 dated Nov. 5, 2019.
Chinese Office Action received in corresponding Chinese Application No. 201680078868.0 dated Jul. 1, 2020.

\* cited by examiner

FIG. 12
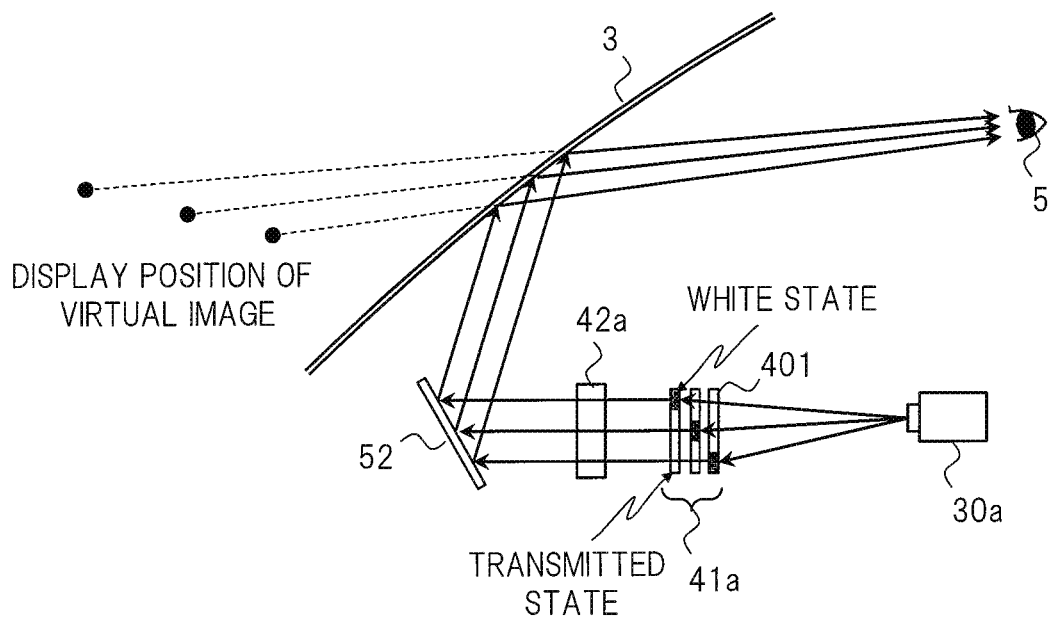
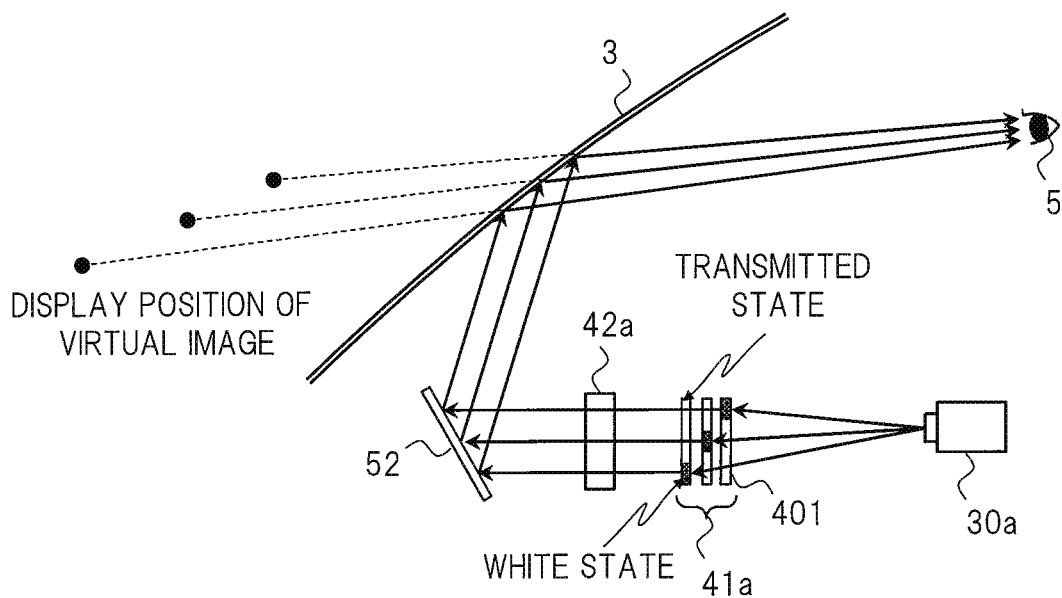

FIG. 16
(a)
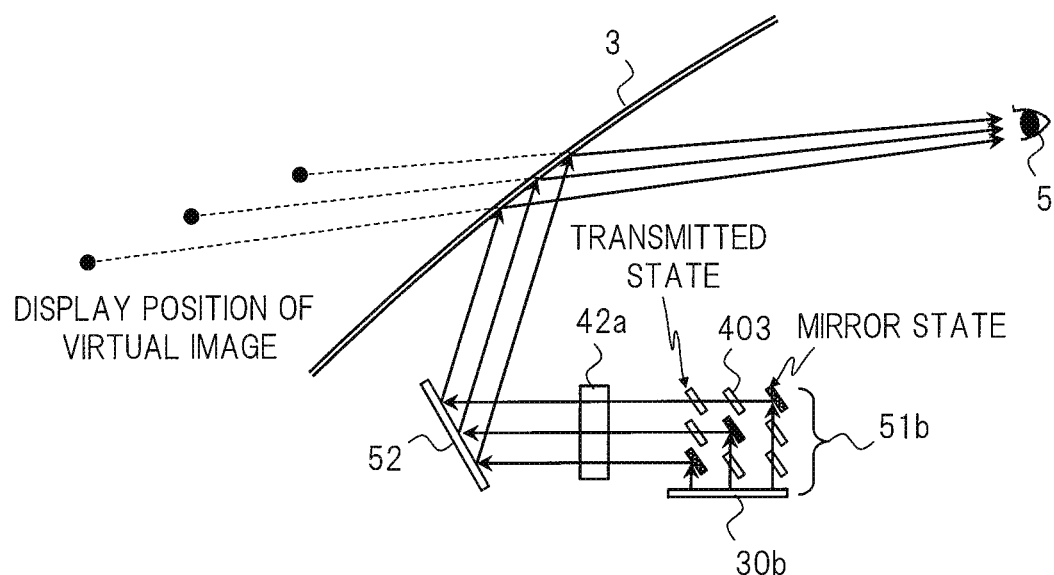
(b)
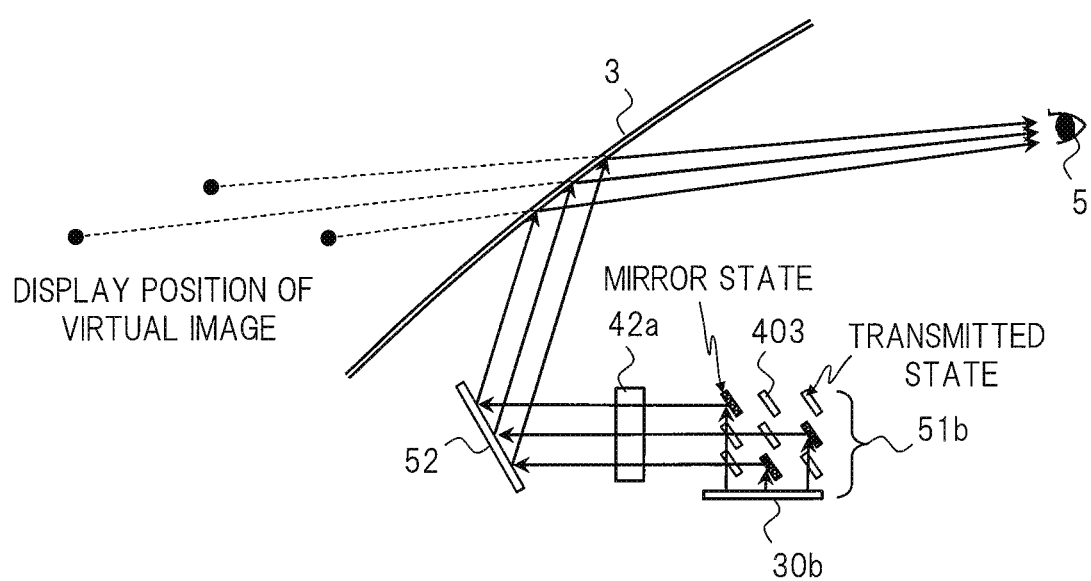

FIG. 19
(a)
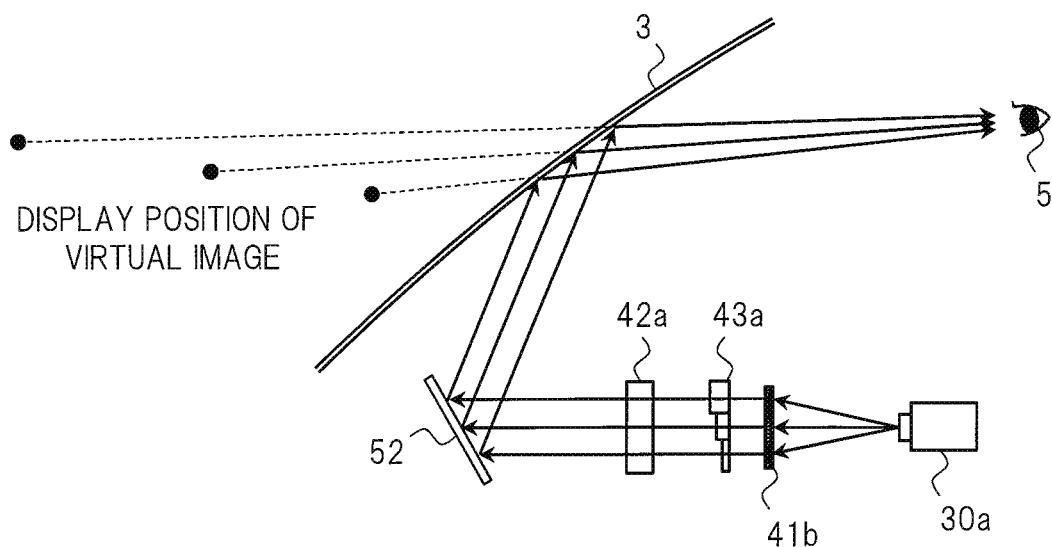
(b)
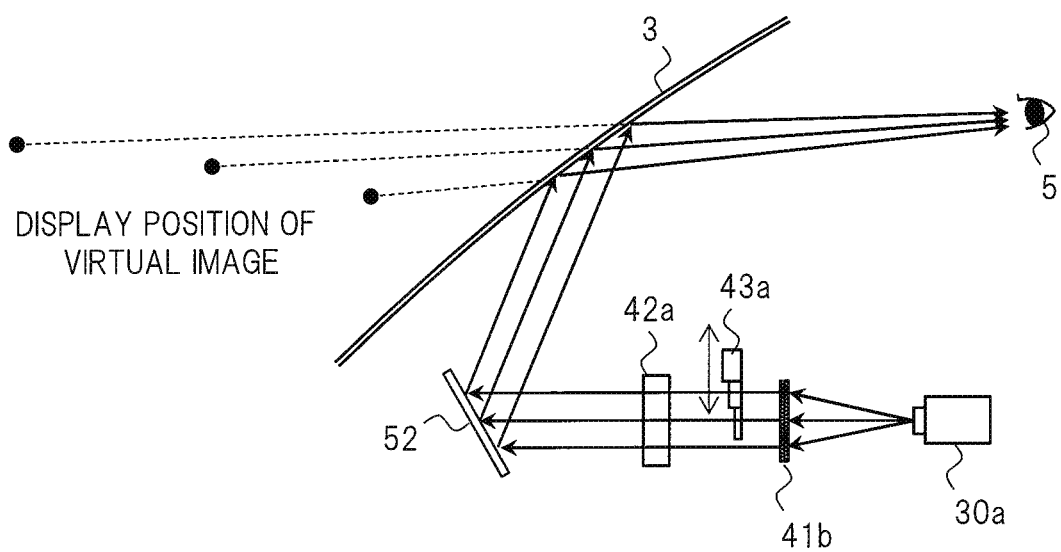

FIG. 24

| No. | BRIGHTNESS (lx) | RUNNING ROAD | MAXIMUM DISPLAY DISTANCE (m) |
|---|---|---|---|
| 1 | <10 | - | 5 |
| 2 | 10~15,000 | - | 20 |
| 3 | 15,001~50,000 | - | 40 |
| 4 | >50,000 | URBAN AREA | 40 |
| 5 | | EXPRESSWAY | 100 |

FIG. 28
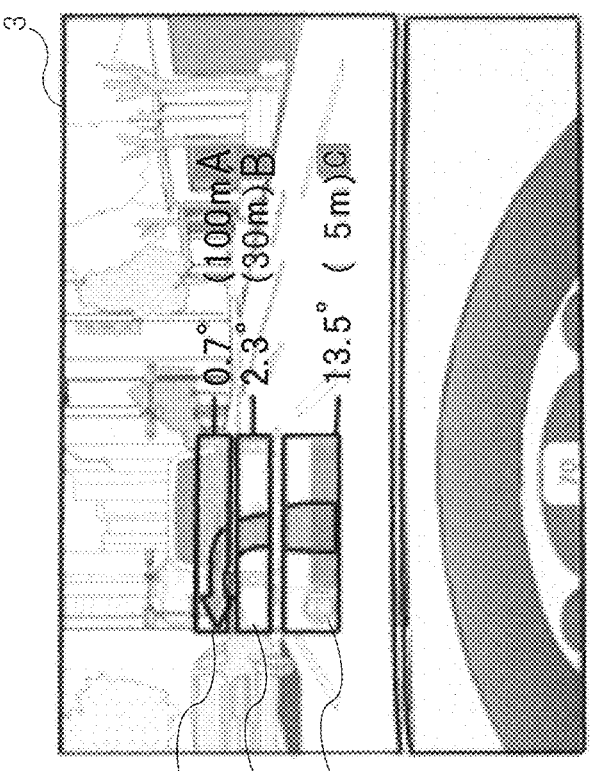
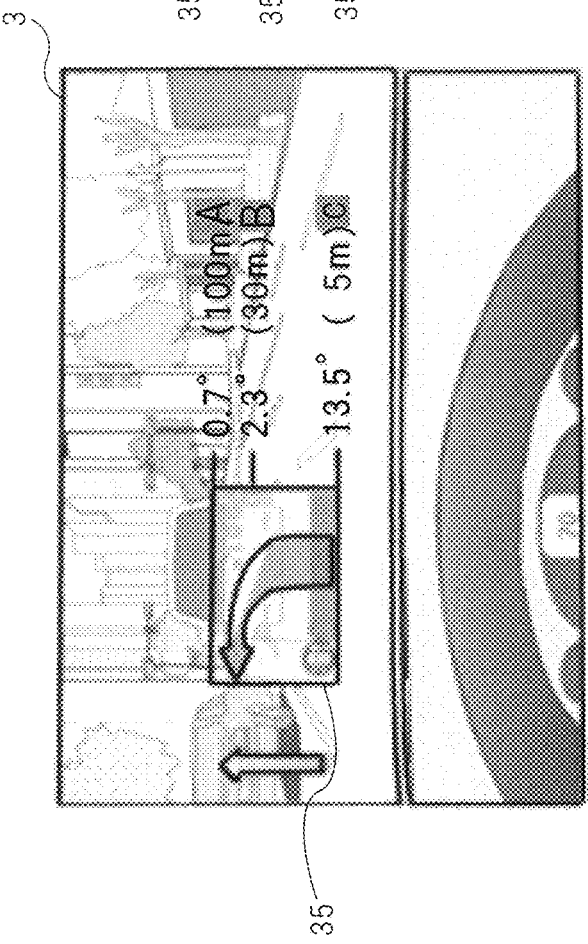

FIG. 30
(a)
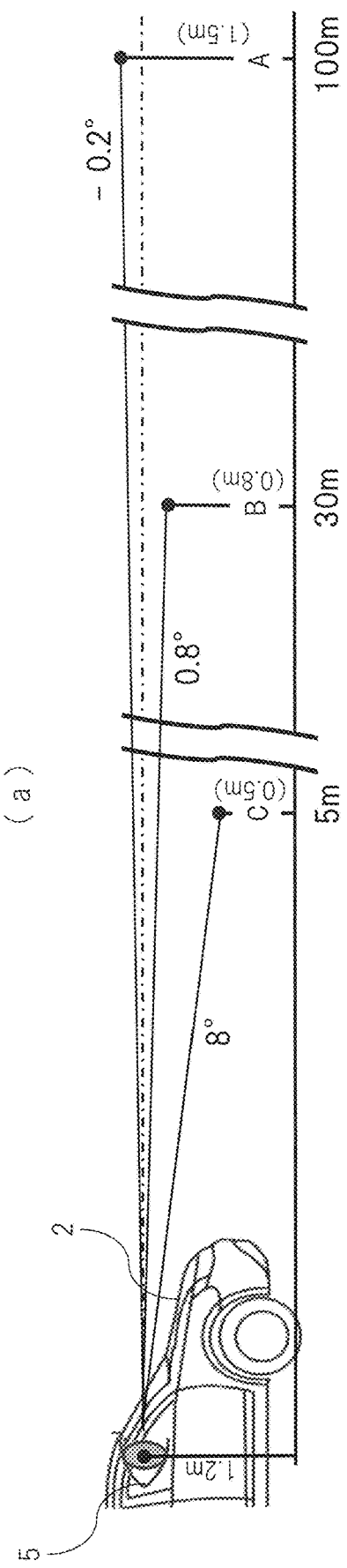
(b)
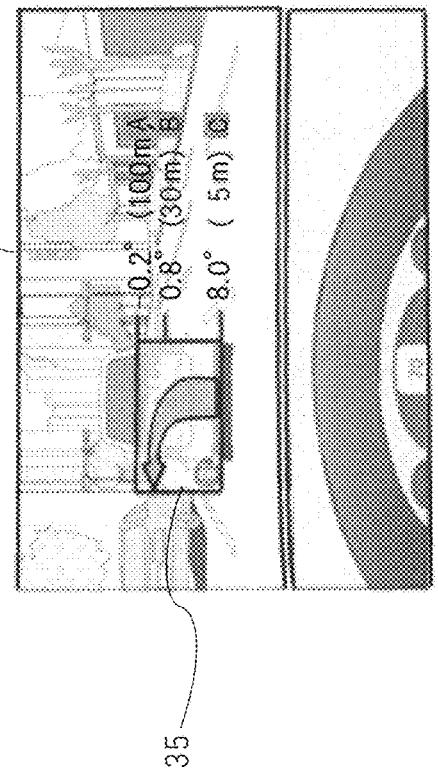

HEAD-UP DISPLAY APPARATUS

TECHNICAL FIELD

The present invention relates to a head-up display apparatus, and more particularly, to a technique that can be effectively applied to a head-up display apparatus using augmented reality (AR).

BACKGROUND ART

For example, for a vehicle such as an automobile, information such as a vehicle speed and a rotational speed of an engine is typically displayed on an instrument panel in a dashboard. Also, a screen of a car navigation system or the like is incorporated in the dashboard or displayed on a display set up on the dashboard. When a driver visually recognizes these pieces of information, it is required to move a line of sight largely, and thus, as a technique of reducing a movement amount of the line of sight, a head-up display (Head Up Display, hereinafter referred to as "HUD," in some cases) which projects information such as a vehicle speed and information such as an instruction relating to a car navigation system onto a front glass (windshield) to display has been known.

In an in-vehicle display apparatus also including the HUD, since a vehicle may vibrate or incline in accordance with a running condition, a case in which visibility of a display video image may cause a problem or a case in which suitable contents cannot be displayed may be generated, in some cases.

As a technique related to improvement in visibility of a display video image in the HUD, for example, Japanese Patent Application Laid-Open Publication No. 2013-237320 (Patent Document 1) discloses that a rotational component generated in a vehicle body is acquired as an inclination of the vehicle body, a video image is rotationally corrected three-dimensionally based on this inclination, and a position and an inclination for displaying the rotationally corrected video image are decided to project and display the video image.

Also, Japanese Patent Application Laid-Open Publication No. 2007-55365 (Patent Document 2) discloses that, when a distance scale is displayed in an HUD, by acquiring information of a running point at which an own vehicle is currently running, and information of a scheduled running point at which the own vehicle will run from a map data of a navigation device, an incline angle of a road on which the own vehicle runs is acquired based on these pieces of information, and a display height of the distance scale from a ground is corrected by using a correction coefficient in accordance with the incline angle and displayed.

Also, Japanese Patent Application Laid-Open Publication No. 2006-7867 (Patent Document 3) discloses that, in accordance with a detected running condition such as a right or left turn and accelerated or decelerated speed, control is performed such that a display position of a generated video image is, for example, shifted in the left direction when the left turn is detected and shifted in the right direction when the right turn is detected.

Also, Japanese Patent Application Laid-Open Publication No. 2015-202842 (Patent Document 4) discloses that a display position of video image information is moved in a direction in which a field of view of a driver is ensured according to a vehicle state.

RELATED ART DOCUMENTS

Patent Documents

Patent Document 1: Japanese Patent Application Laid-Open Publication No. 2013-237320
Patent Document 2: Japanese Patent Application Laid-Open Publication No. 2007-55365
Patent Document 3: Japanese Patent Application Laid-Open Publication No. 2006-7867
Patent Document 4: Japanese Patent Application Laid-Open Publication No. 2015-202842

SUMMARY OF THE INVENTION

Problems to be Solved by the Invention

The HUD projects a video image onto a windshield, allowing a driver to recognize the video image as a virtual image outside a vehicle. In contrast, an HUD (hereinafter referred to as an "AR-HUD," in some cases) achieving a so-called AR function capable of showing information related to an object etc. to the driver by displaying such that a virtual image is overlapped with actual scenery outside the vehicle seen through the windshield, has been known. Even in such AR-HUD, it is required to perform adjustment for maintaining visibility, suitability, and the like of a display video image, in accordance with a running condition and the like of the vehicle.

In this regard, for example, using the techniques disclosed in Patent Documents 1 to 3 above enables reduction and elimination of adverse influence on visibility and suitability of the display video image (virtual image) even in a case in which the vehicle vibrates or inclines in accordance with a running condition. Meanwhile, these techniques perform adjustment of a display position, display contents, and the like of a video image to be displayed in a display region of the virtual image in the HUD as an object, in accordance with a running condition. However, in the case of the HUD, taking into consideration such a configuration that an effect of reducing a movement amount of a line of sight of a driver can be obtained regardless of a running condition of a vehicle, it is desirable to perform not only adjustment of the video image in the display region, but also adjustment of moving a position of the display region itself, for example.

In this regard, in the technique disclosed in Patent Document 4, it is possible to move the display region itself in the HUD in accordance with the vehicle state. However, the technique disclosed in Patent Document 4 is intended to ensure the field of view of the driver even when the vehicle state has changed and is to move the display region in the HUD to a position at which the display region does not become hindrance to the driver. Applying such technique to the AR-HUD causes a case in which a virtual image cannot be overlapped with actual scenery included in the field of view of the driver, whereby the AR function fails to have workability.

In view of this, an object of the present invention is to provide a head-up display apparatus capable of displaying a virtual image so as to be suitably overlapped with actual scenery in accordance with a running condition of a vehicle.

The above and other objects and novel features of the present invention will be apparent from the description of the present specification and the accompanying drawings.

Means for Solving the Problems

The typical ones of the inventions disclosed in the present application will be briefly described as follows.

A head-up display apparatus according to a typical embodiment of the present invention which displays a virtual image to be overlapped with scenery in front of a vehicle with respect to a driver by projecting a video image onto a windshield of the vehicle, the head-up display apparatus includes:

a vehicle information acquisition unit configured to acquire various kinds of vehicle information which can be detected by the vehicle;

a controller configured to control display of the video image based on the vehicle information acquired by the vehicle information acquisition unit;

a video image display configured to form the video image based on an instruction from the controller;

a mirror configured to reflect the video image formed by the video image display to project onto the windshield;

a mirror driver configured to change an angle of the mirror based on an instruction from the controller; and a display distance adjusting mechanism configured to adjust a display distance of the virtual image with respect to the driver.

Then, the controller adjusts the angle of the mirror via the mirror driver based on the vehicle information such that the virtual image can be displayed with respect to the driver to be overlapped with the scenery.

Effects of the Invention

Effects obtained by the typical ones of the inventions disclosed in the present application will be briefly described as follows.

Specifically, according to the typical embodiment of the present invention, it is possible to display a virtual image to be suitably overlapped with actual scenery in accordance with a running condition of a vehicle in an AR-HUD.

BRIEF DESCRIPTIONS OF THE DRAWINGS

Figure 13:
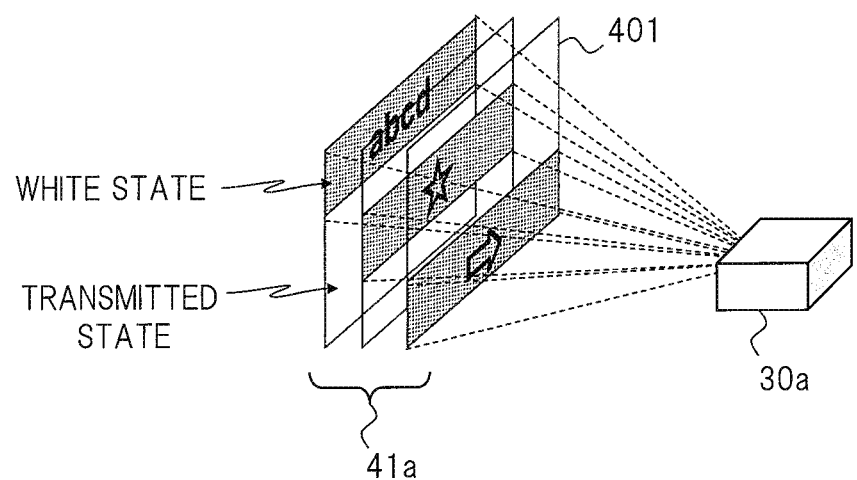
Figure 14:
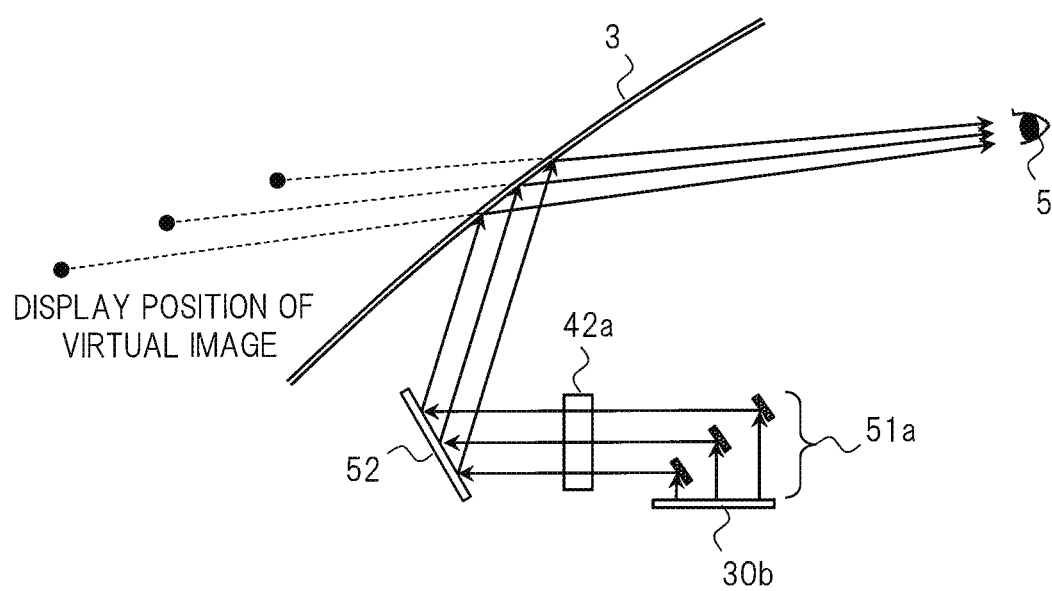
Figure 15:
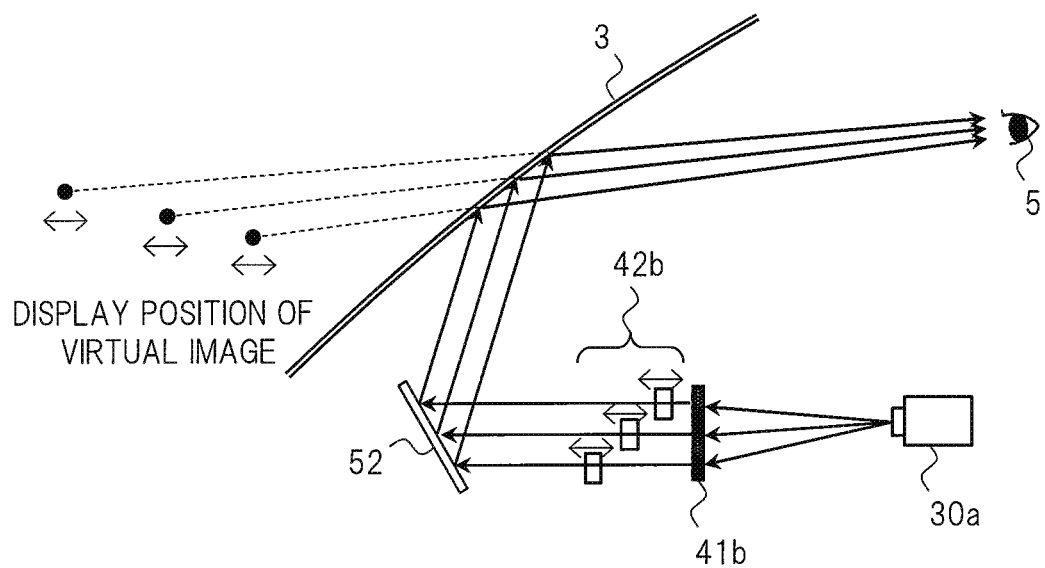
Figure 17:
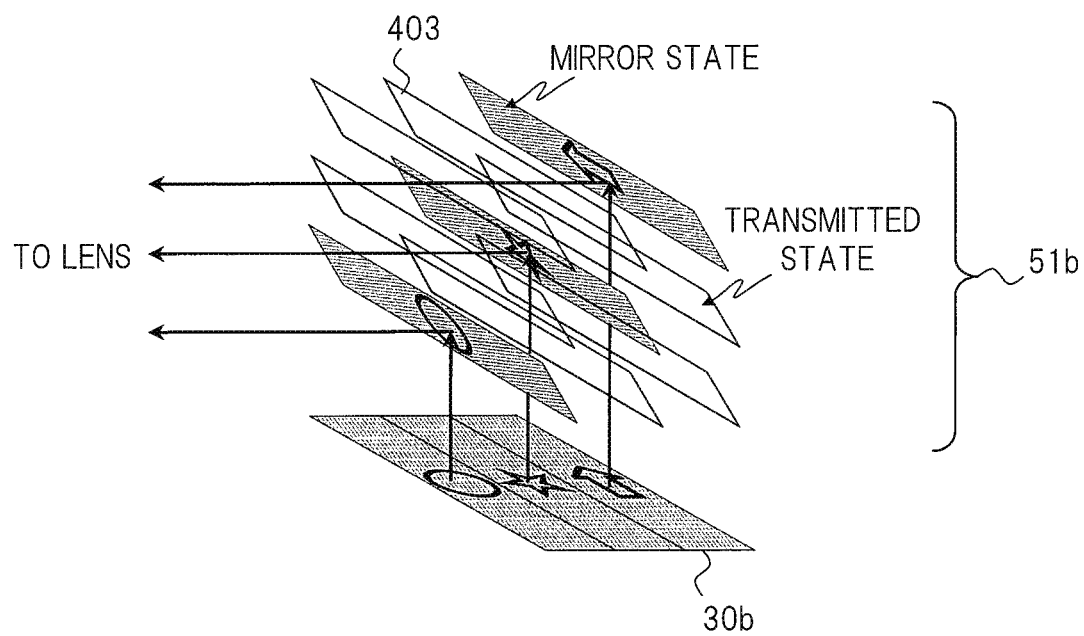
Figure 18:
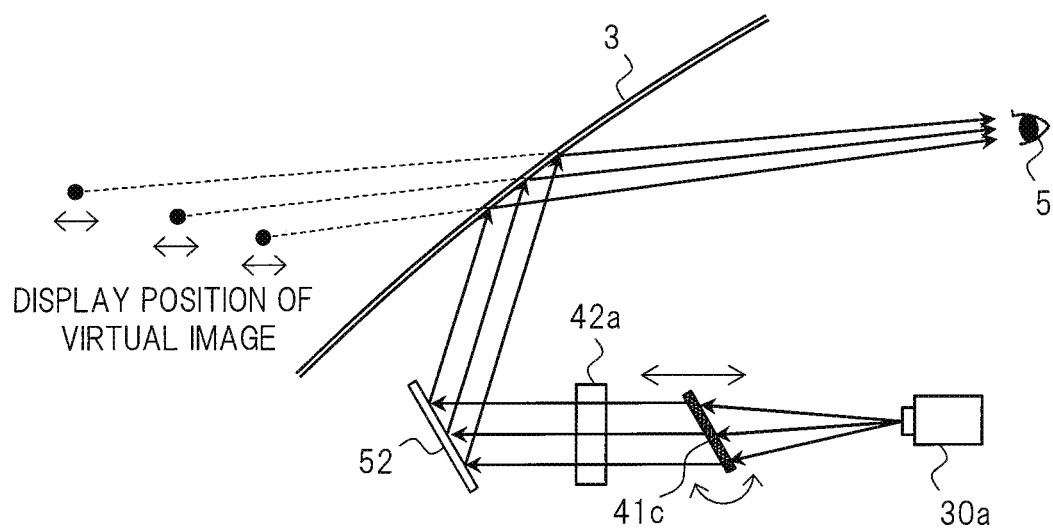
Figure 20:
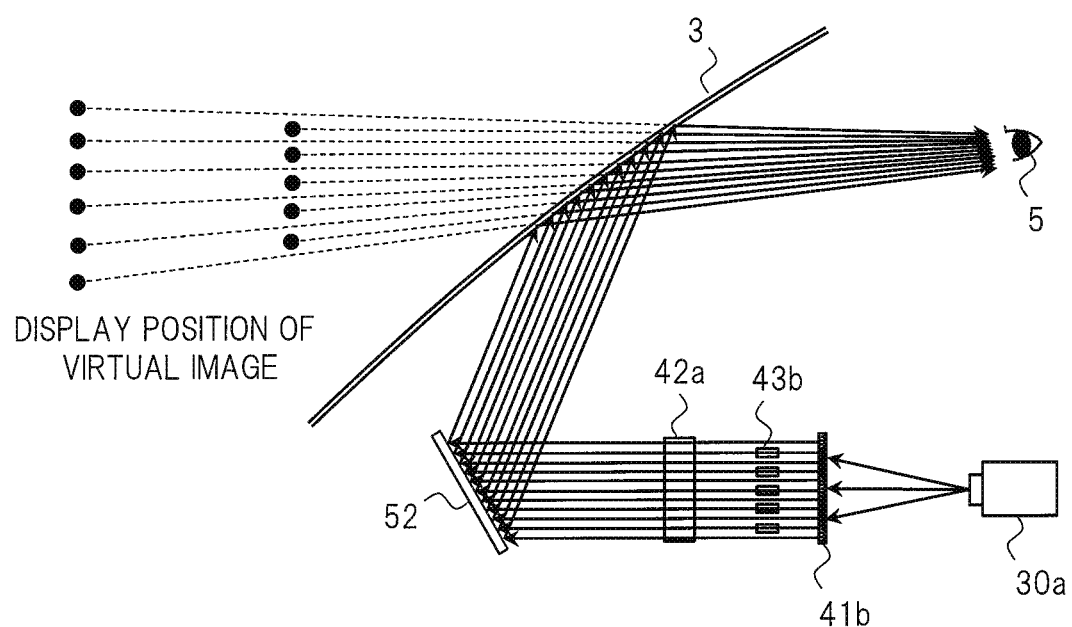
Figure 21:
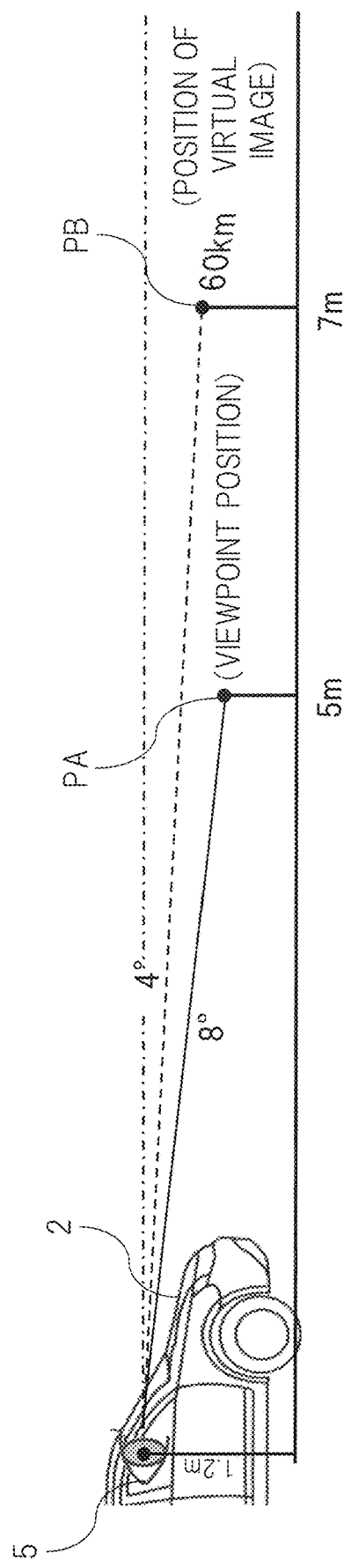
Figure 22:
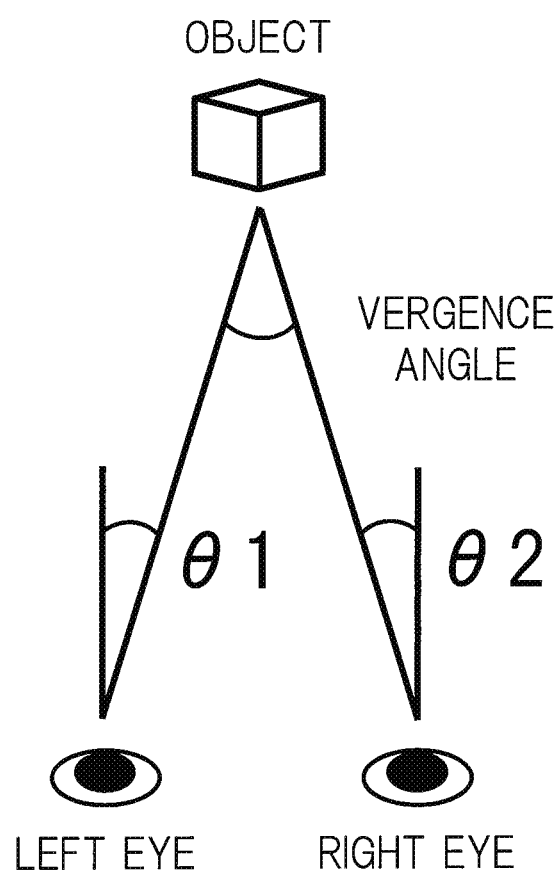
Figure 23:
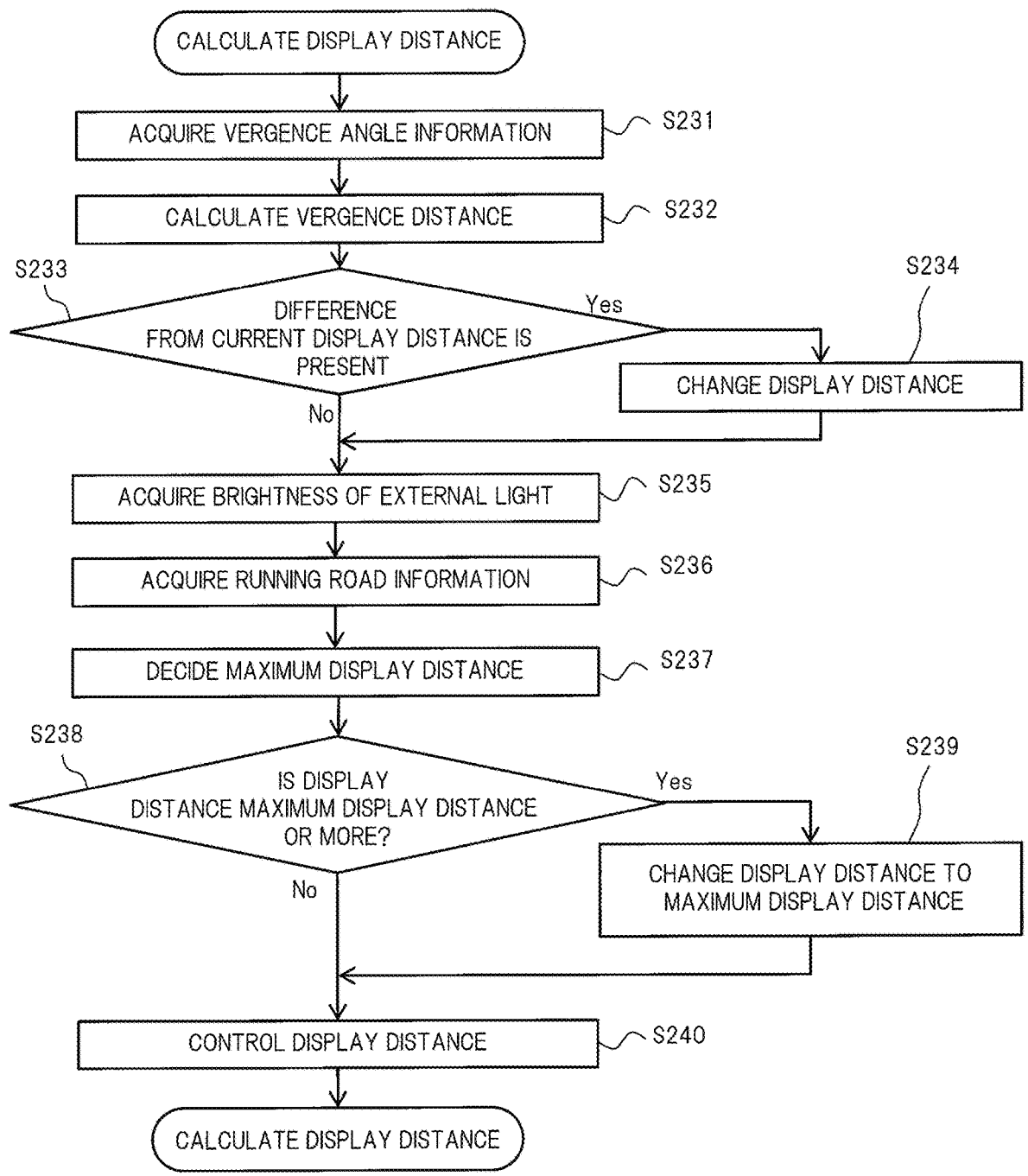
Figure 25:
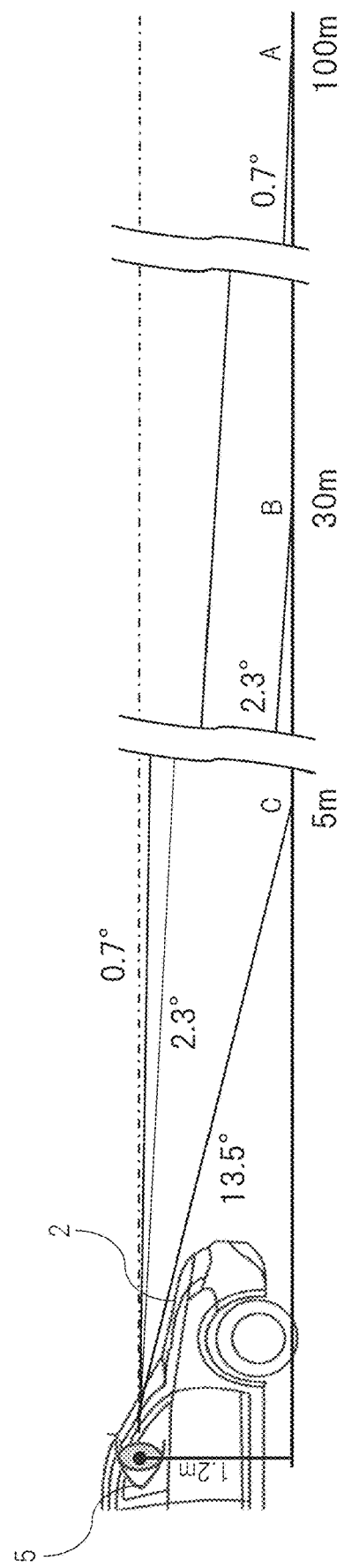
Figure 26:
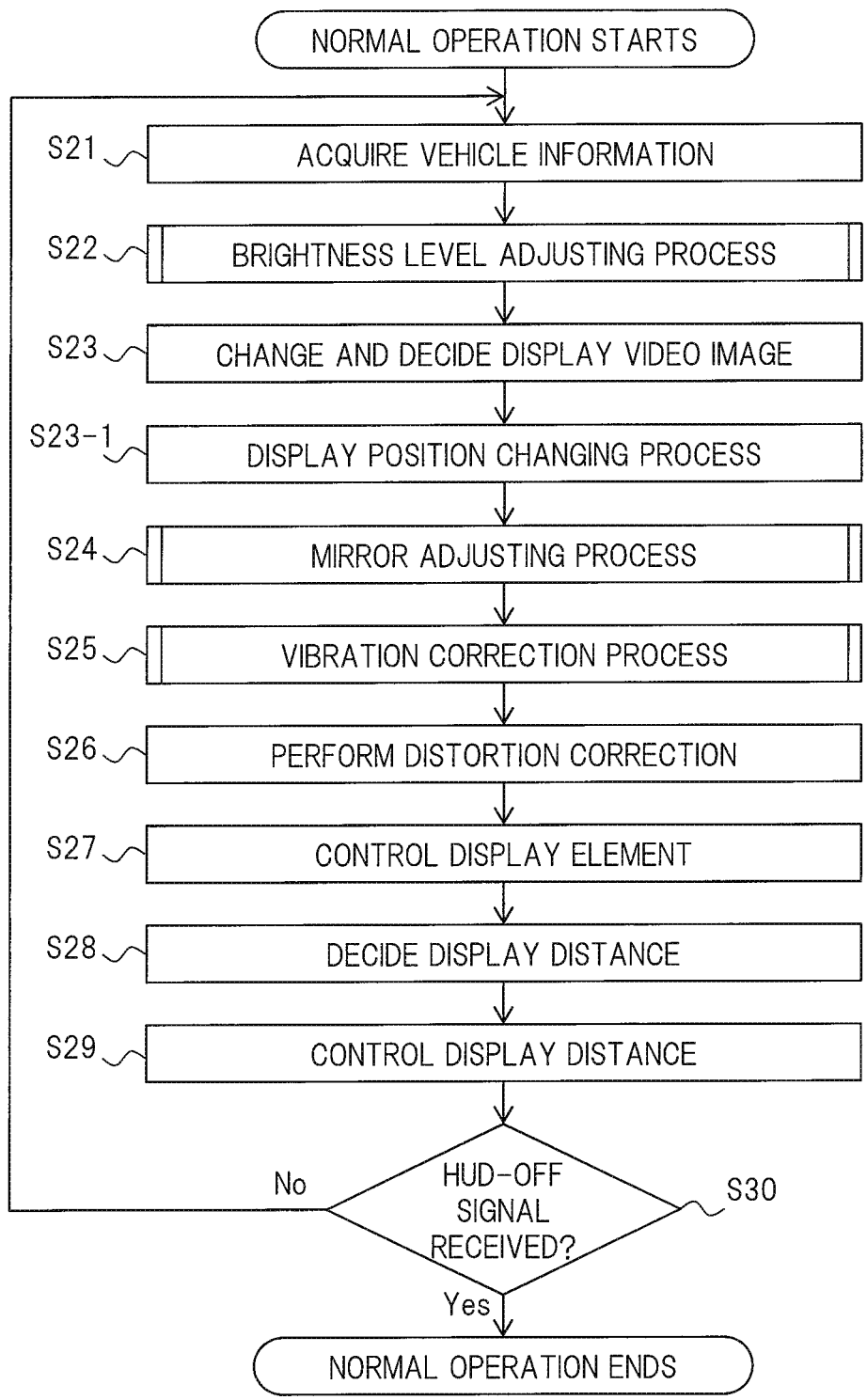
Figure 27:
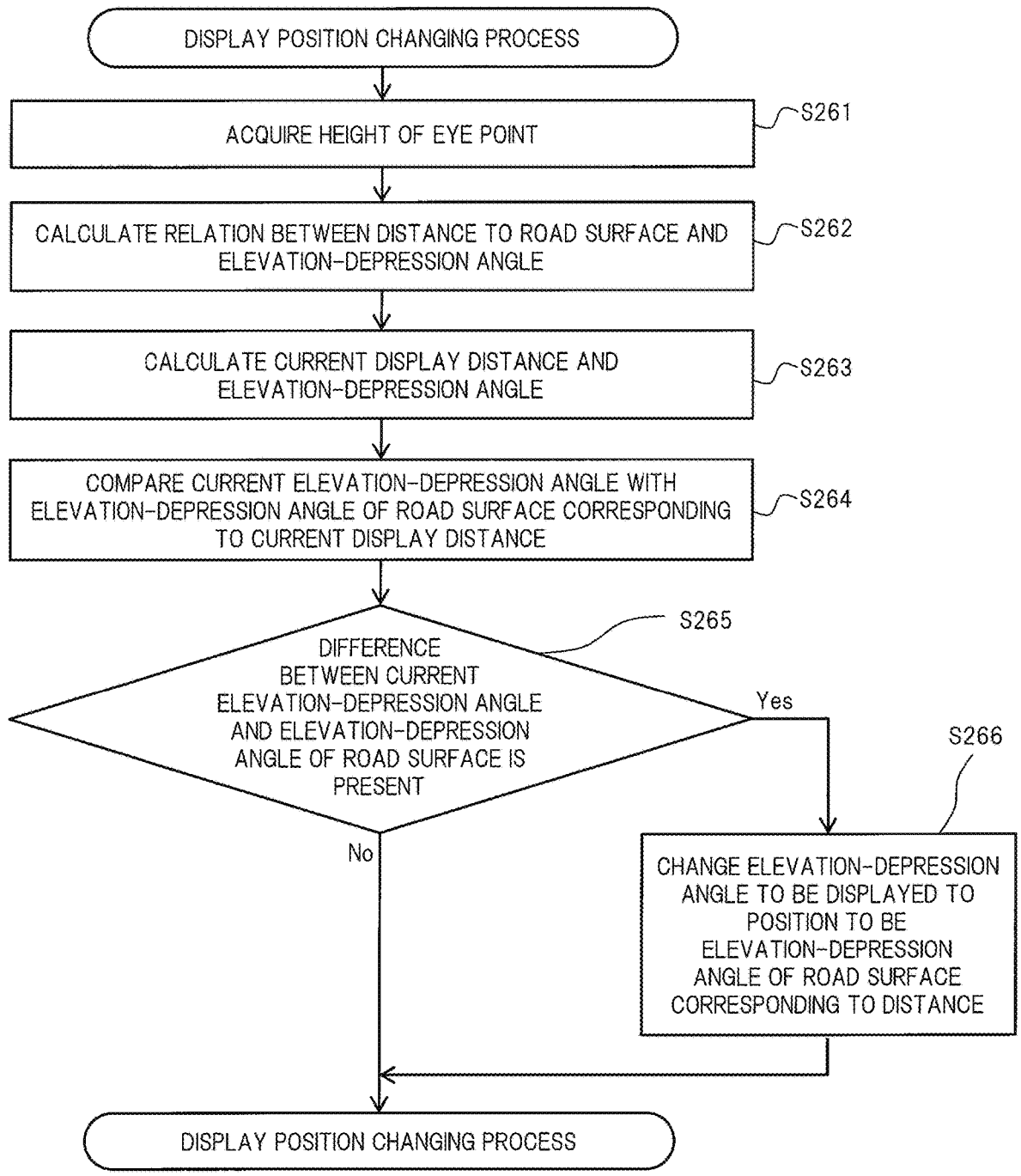

FIGS. 12(a) and 12(b) are views illustrating an outline of an example of display distance adjustment using a functional liquid crystal film according to the one embodiment of the present invention;

FIG. 13 is a view illustrating an outline of a configuration example of a diffuser constituted by the functional liquid crystal films according to the one embodiment of the present invention;

FIG. 14 is a view illustrating an outline of an example of display distance adjustment using a plurality of mirrors according to the one embodiment of the present invention;

FIG. 15 is a view illustrating an outline of an example of display distance adjustment using a movable lens according to the one embodiment of the present invention;

FIGS. 16(a) and 16(b) are views illustrating an outline of an example of display distance adjustment using a light control mirror according to the one embodiment of the present invention;

FIG. 17 is a view illustrating an outline of a configuration example of the light control mirror according to the one embodiment of the present invention;

FIG. 18 is a view illustrating an outline of an example of display distance adjustment using a movable diffuser according to the one embodiment of the present invention;

FIGS. 19(a) and 19(b) are views illustrating an outline of an example of display distance adjustment using a movable optical filter according to the one embodiment of the present invention;

FIG. 20 is a view illustrating an outline of an example of display distance adjustment using a comb-like optical filter according to the one embodiment of the present invention;

FIG. 21 is a view explaining a problem caused by a difference in focus distance of a driver while driving;

FIG. 22 is a view explaining a vergence angle of the driver while driving;

FIG. 23 is a flow chart illustrating detailed contents of display distance control of the virtual image by the vergence angle and the like according to the one embodiment of the present invention;

FIG. 24 is a view illustrating one example of a table set in advance with respect to running road information used in the above display distance control;

FIG. 25 is a view illustrating a case in which a display distance of the virtual image is set over the road surface ahead of the vehicle to explain a display method of the virtual image and distance control by an eye point;

FIG. 26 is a flow chart illustrating an execution position of a display position changing process achieving control of the display distance of the virtual image by a height of the eye point;

FIG. 27 is a flow chart illustrating details of the display position changing process achieving the control of the display distance of the virtual image by the height of the eye point;

FIGS. 28(a) and 28(b) are views illustrating examples of display of the virtual image when displaying such that the display distance of the virtual image continuously changes and when displaying in a stepwise manner, respectively;

FIGS. 29(a) and 29(b) are views illustrating examples of an elevation-depression angle and a display distance when the display distance of the virtual image is set to a certain height from the road surface ahead of the vehicle, and display of the virtual image in that case; and FIGS. 30(a) and 30(b) are views illustrating examples of a case in which the height of the virtual image from the road surface to be displayed for each display distance of the virtual image can be set arbitrarily, and display of the virtual image in that case.

DETAILED DESCRIPTION OF PREFERRED EMBODIMENTS

Hereinafter, embodiments of the present invention will be described in detail in accordance with the drawings. Note that the same components are denoted by the same reference characters throughout the drawings for describing the embodiments in principle, and the repetitive description thereof is omitted. Meanwhile, illustration of a portion which has been denoted by a reference character and described in a figure is not repeated in describing another figure, but the portion may be referred to by denoting the same reference character.

<Apparatus Configuration>

Figure 2:
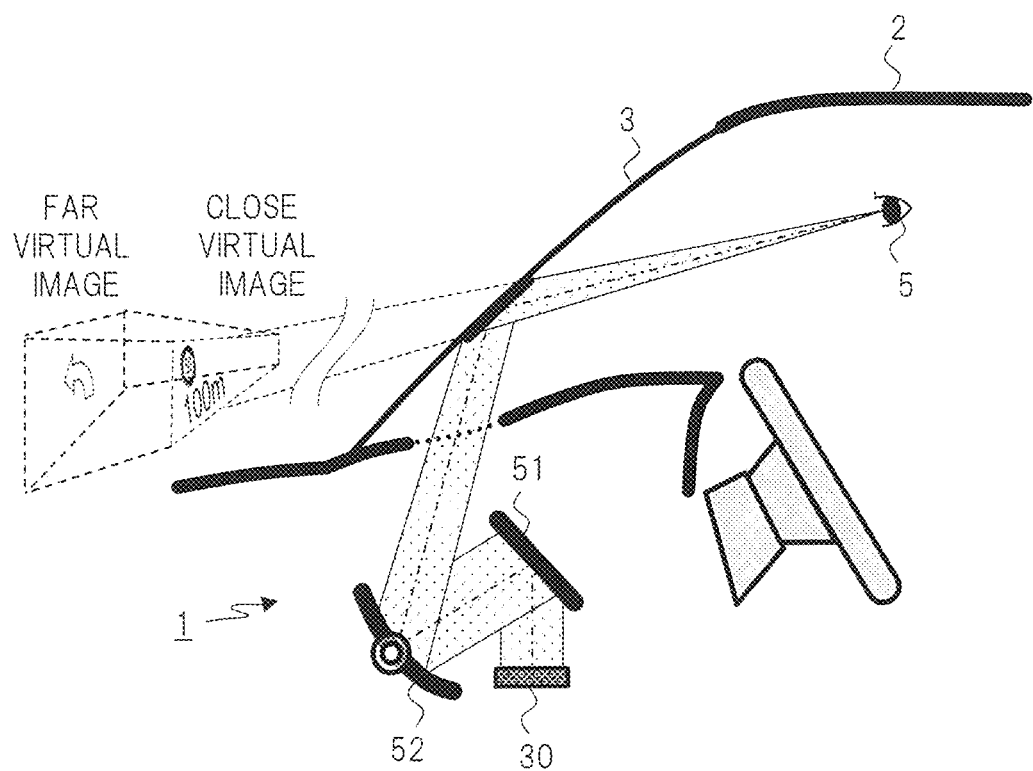
FIG. 2 is a view illustrating an outline of an example of an operation concept of the head-up display apparatus according to the one embodiment of the present invention.

FIG. 2 is a view illustrating an outline of an example of an operation concept of a head-up display apparatus according to one embodiment of the present invention. In an AR-HUD 1 of the present embodiment, a video image displayed on a video image display 30 constituted by a projector, an LCD (liquid Crystal Display), and the like is reflected by a mirror 51 and a mirror 52 (for example, a free-form surface mirror, a mirror having an asymmetric shape with respect to an optical axis, or the like) and projected onto a windshield 3 of a vehicle 2.

A driver 5 sees the video image projected onto the windshield 3 and then, visually recognizes the above video image as a virtual image through the transparent windshield 3 in front thereof. In the present embodiment, as described later, by adjusting an angle of the mirror 52, a position where the video image is projected onto the windshield 3 is adjusted, so that it is possible to adjust a display position of the virtual image which the driver 5 sees, in an upward and downward direction. Also, by using various kinds of methods described later, it is also possible to adjust a display distance, for example, displaying the virtual image near (for example, 2 to 3 m ahead) or displaying the virtual image far (for example, 30 to 40 m ahead). Then, adjusting the display position and the display distance of the virtual image such that the virtual image is overlapped with scenery outside the vehicle (a road, a building, a person, etc.) achieves an AR function.

Figure 1:
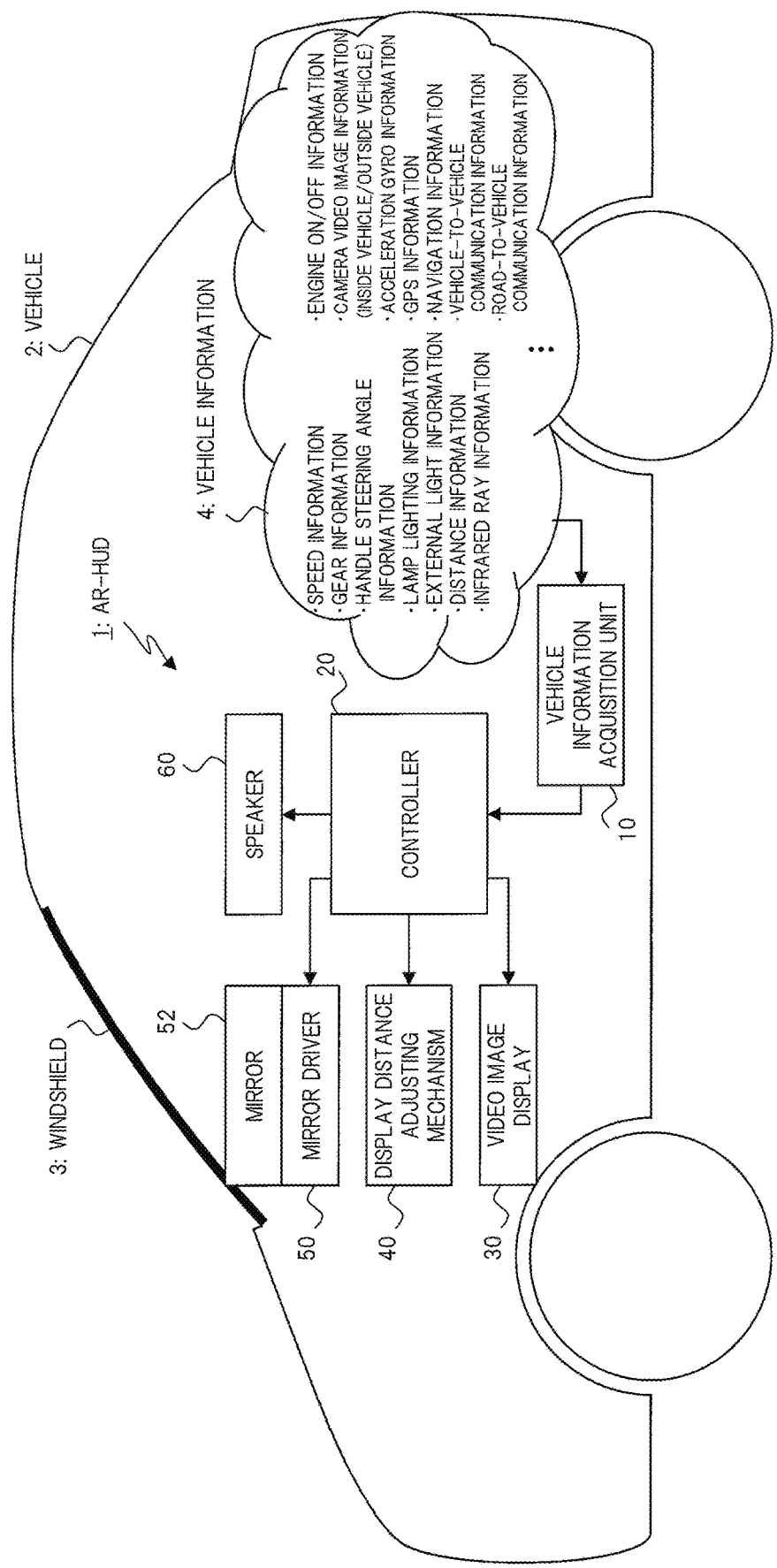
FIG. 1 is a functional block diagram illustrating an outline of an overall configuration example of a head-up display apparatus according to one embodiment of the present invention.

FIG. 1 is a functional block diagram illustrating an outline of an overall configuration example of the head-up display apparatus according to the one embodiment of the present invention. The AR-HUD 1 mounted in the vehicle 2 includes, for example, a vehicle information acquisition unit 10, a controller 20, the video image display 30, a display distance adjusting mechanism 40, a mirror driver 50, the mirror 52, and a speaker 60. Note that, although a shape of the vehicle 2 is displayed like a passenger car in the example of FIG. 1, it is not limited to this and can be appropriately applied to all kinds of general vehicles.

The vehicle information acquisition unit 10 includes information acquisition devices such as various types of sensors set up in respective units of the vehicle 2 to be described later, and the vehicle information acquisition unit 10 detects various events generated in the vehicle 2 and detects and acquires values of various parameters relating to a running condition at a predetermined interval, thereby acquiring vehicle information 4 to output. The vehicle information 4 can include, as illustrated, speed information and gear information of the vehicle 2, handle steering angle information, lamp lighting information, external light information, distance information, infrared ray information, engine ON/OFF information, camera video image information (inside a vehicle/outside a vehicle), acceleration gyro information, GPS (Global Positioning System) information, navigation information, vehicle-to-vehicle communication information, road-to-vehicle communication information, and the like, for example.

The controller 20 has a function of controlling an operation of the AR-HUD 1 and for example, is mounted with a CPU (Central Processing Unit) and software executed thereby. The controller 20 may be mounted with hardware such as a microcomputer or an FPGA (Field Programmable Gate Array). As illustrated also in FIG. 2, the controller 20 drives the video image display 30 to form a video image to be displayed as a virtual image based on the vehicle information 4 and the like acquired from the vehicle information acquisition unit 10 and has the video image reflected appropriately by the mirror 52 or the like, thereby projecting the video image onto the windshield 3. Then, by a method described later, control such as adjusting the display position of a display region of the virtual image or adjusting the display distance of the virtual image is performed.

As described above, the video image display 30 is a device constituted by the projector and the LCD, for example, and forms a video image for displaying a virtual image based on an instruction from the controller 20 to project and display the video image. The display distance adjusting mechanism 40 is a mechanism for adjusting a distance of a virtual image to be displayed from the driver 5 based on an instruction from the controller 20, and for example, is mounted with any one or more of various kinds of display distance adjusting methods described later.

The mirror driver 50 adjusts an angle of the mirror 52 based on an instruction from the controller 20 and adjusts a position of the display region of the virtual image in the upward and downward direction. Adjusting the position of the display region of the virtual image will be described later. The speaker 60 performs audio output relating to the AR-HUD 1. For example, it is possible to perform voice guidance of the navigation system, audio output in notifying the driver 5 of a warning etc. by the AR function, and the like.

Figure 3:
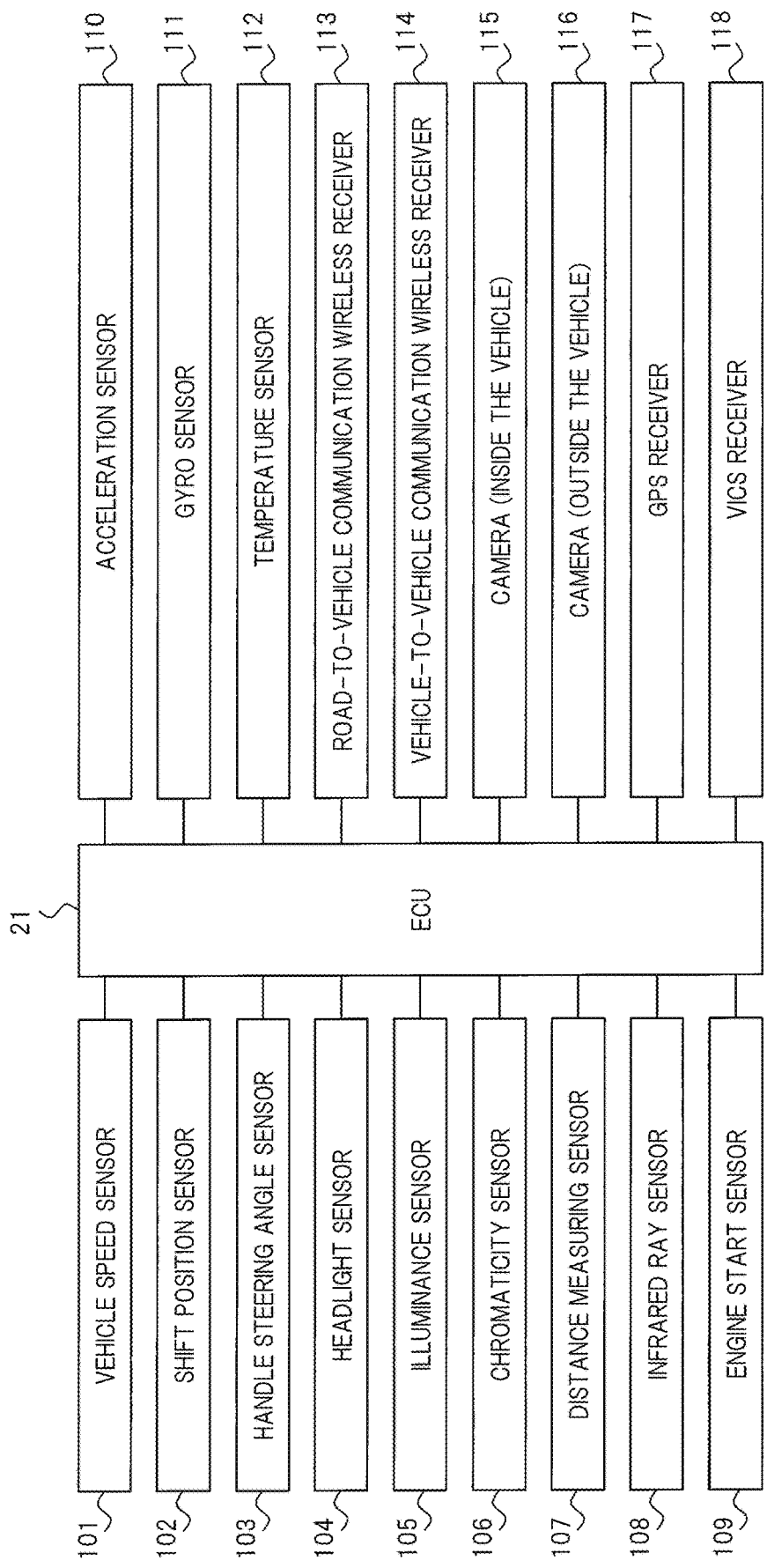
FIG. 3 is a view illustrating an outline of an example of a hardware configuration relating to acquisition of vehicle information according to the one embodiment of the present invention.

FIG. 3 is a view illustrating an outline of an example of a hardware configuration relating to acquisition of the vehicle information 4 in the head-up display apparatus according to the present embodiment. Herein, part of the hardware configuration of the vehicle information acquisition unit 10 and the controller 20 are mainly indicated. Acquisition of the vehicle information 4 is, for example, performed by the information acquisition devices such as various types of sensors connected to an ECU (Electronic Control Unit) 21 under control of the ECU 21.

These information acquisition devices include, for example, a vehicle speed sensor 101, a shift position sensor 102, a handle steering angle sensor 103, a headlight sensor 104, an illuminance sensor 105, a chromaticity sensor 106, a distance measuring sensor 107, an infrared ray sensor 108, an engine start sensor 109, an acceleration sensor 110, a gyro sensor 111, a temperature sensor 112, a road-to-vehicle communication wireless receiver 113, a vehicle-to-vehicle communication wireless receiver 114, a camera (inside the vehicle) 115, a camera (outside the vehicle) 116, a GPS receiver 117, a VICS (Vehicle Information and Communication System, registered trademark (the same applies hereinafter)) receiver 118, and the like. It is not always necessary to include all the devices, and other kinds of devices may be included. It is possible to appropriately use the vehicle information 4 which can be acquired by a device included.

The vehicle speed sensor 101 acquires the speed information of the vehicle 2. The shift position sensor 102 acquires the current gear information of the vehicle 2. The handle steering angle sensor 103 acquires the handle steering angle information. The headlight sensor 104 acquires the lamp lighting information relating to ON/OFF of the headlight. The illuminance sensor 105 and the chromaticity sensor 106 acquire the external light information. The distance measuring sensor 107 acquires the distance information between the vehicle 2 and an external object. The infrared ray sensor 108 acquires the infrared ray information relating to presence/absence of an object at a close distance of the vehicle 2, a distance, and the like. The engine start sensor 109 detects the engine ON/OFF information.

The acceleration sensor 110 and the gyro sensor 111 acquire the acceleration gyro information including acceleration and angle speed as information of posture and behavior of the vehicle 2. The temperature sensor 112 acquires the temperature information inside and outside the vehicle. The road-to-vehicle communication wireless receiver 113 and the vehicle-to-vehicle communication wireless receiver 114 acquire the road-to-vehicle communication information received by road-to-vehicle communication between the vehicle 2 and a road, a road sign, a traffic light, etc., and the vehicle-to-vehicle communication information received by vehicle-to-vehicle communication between the vehicle 2 and other vehicles around the vehicle 2, respectively.

The camera (inside the vehicle) 115 and the camera (outside the vehicle) 116 shoot moving images of conditions inside the vehicle and outside vehicle to acquire the camera video image information (inside the vehicle/outside the vehicle), respectively. The camera (inside the vehicle) 115 shoots a posture, a position of the eye, and motion of the driver 5, for example. By analyzing obtained moving images, it is possible to grasp a fatigue condition and a position of the line of sight of the driver 5, for example. Also, the camera (outside the vehicle) 116 shoots a surrounding condition such as the front and the back of the vehicle 2. By analyzing obtained moving images, it is possible to grasp presence/absence of a moving object such as other vehicle and a person around the vehicle 2, a building and geography, a road surface condition (rain, fallen snow, frozen, bump, etc.), and the like, for example.

The GPS receiver 117 and the VICS receiver 118 acquire the GPS information obtained by receiving a GPS signal and the VICS information obtained by receiving a VICS signal, respectively. These receivers may be mounted as apart of the car navigation system acquiring these pieces of information to use.

Figure 4:
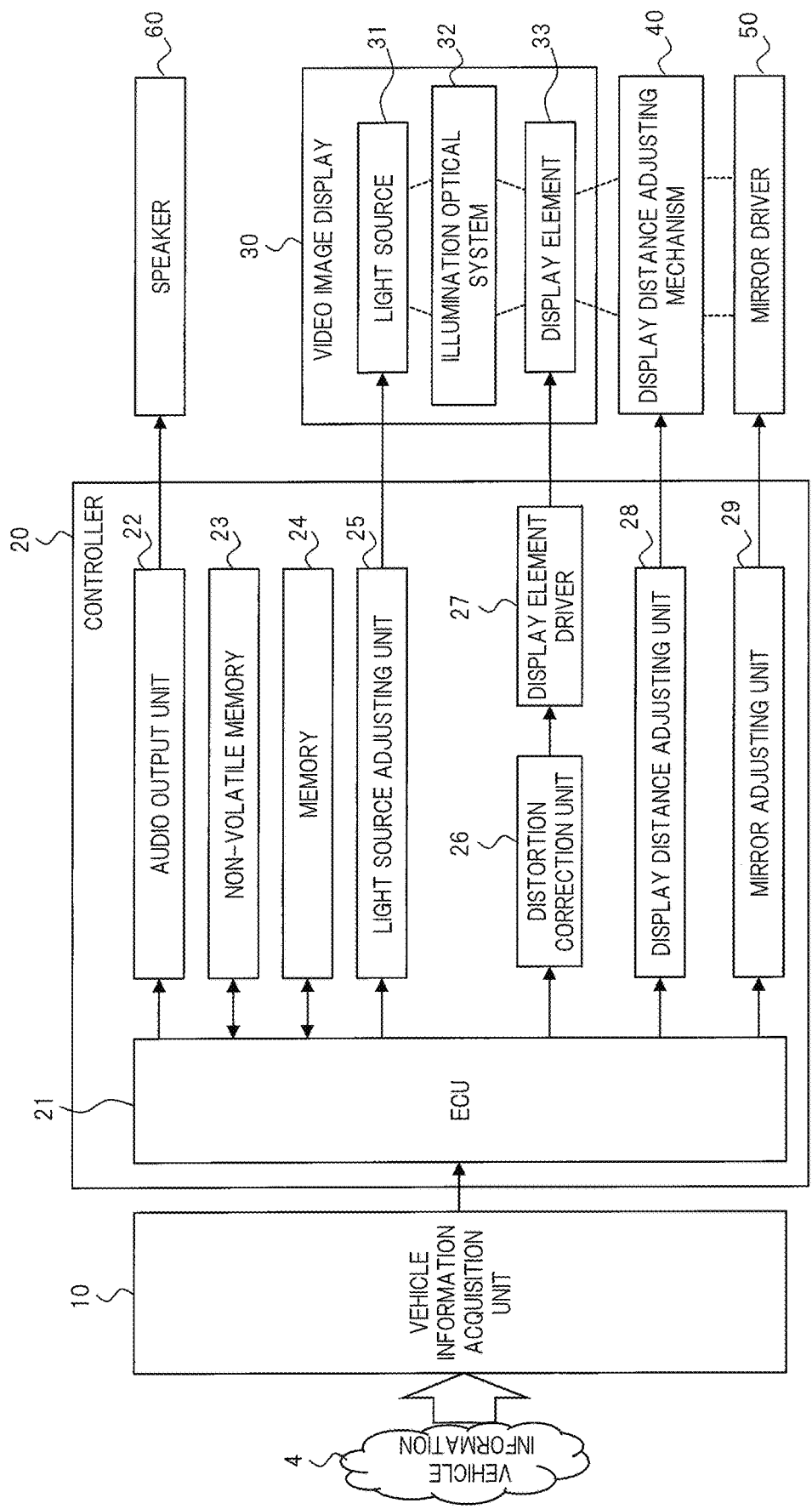
FIG. 4 is a functional block diagram illustrating details of a configuration example of the head-up display apparatus according to the one embodiment of the present invention.

FIG. 4 is a functional block diagram illustrating details of a configuration example of the head-up display apparatus according to the present embodiment. The example of FIG. 4 illustrates a case in which the video image display 30 is a projector, and the video image display 30 includes a light source 31, an illumination optical system 32, and a display element 33, for example. The light source 31 is a component generating an illumination light for projection, and for example, a high pressure mercury lamp, a xenon lamp, an LED (Light Emitting Diode) light source, a laser light source, or the like can be used. The illumination optical system 32 is an optical system collecting the illumination light generated in the light source 31 and further homogenizing the illumination light to irradiate the display element 33. The display element 33 is an element generating a video image to be projected, and for example, a transmission liquid crystal panel, a reflective liquid crystal panel, a DMD (Digital Micromirror Device) (registered trademark) panel, or the like can be used.

More specifically, the controller 20 includes an ECU 21, an audio output unit 22, a non-volatile memory 23, a memory 24, a light source adjusting unit 25, a distortion correction unit 26, a display element driver 27, a display distance adjusting unit 28, a mirror adjusting unit 29, and the like. As illustrated in FIG. 3, the ECU 21 acquires the vehicle information 4 via the vehicle information acquisition unit 10, records and stores the acquired information in the non-volatile memory 23 or the memory 24, and reads out the acquired information therefrom, as needed. The non-volatile memory 23 may have setting information such as setting values and parameters for various controls stored therein. Also, the ECU 21 generates a video image data relating to a virtual image to be displayed as the AR-HUD 1 by executing a dedicated program, or the like.

The audio output unit 22 outputs audio information via the speaker 60 as needed. The light source adjusting unit 25 adjusts a light emitting amount of the light source 31 of the video image display 30. When there are a plurality of light sources 31, it may be configured so as to control the plurality of light sources 31 individually. When the video image display 30 projects a video image generated by the ECU 21 onto the windshield 3 of the vehicle 2, the distortion correction unit 26 corrects a distortion of the video image generated due to a curvature of the windshield 3 by image processing. The display element driver 27 sends a drive signal in accordance with a video image data corrected by the distortion correction unit 26 to the display element 33, thus generating a video image to be projected.

When the display distance of the virtual image needs to be adjusted, the display distance adjusting unit 28 drives the display distance adjusting mechanism 40 to adjust the display distance of the video image to be projected from the video image display 30. Various methods of adjusting the display distance of the virtual image will be described later. When a position of the display region of the virtual image itself needs to be adjusted, the mirror adjusting unit 29 changes an angle of the mirror 52 via the mirror driver 50 to move the display region of the virtual image up and down. Position adjustment of the display region of the virtual image will be also described later.

Figure 5:
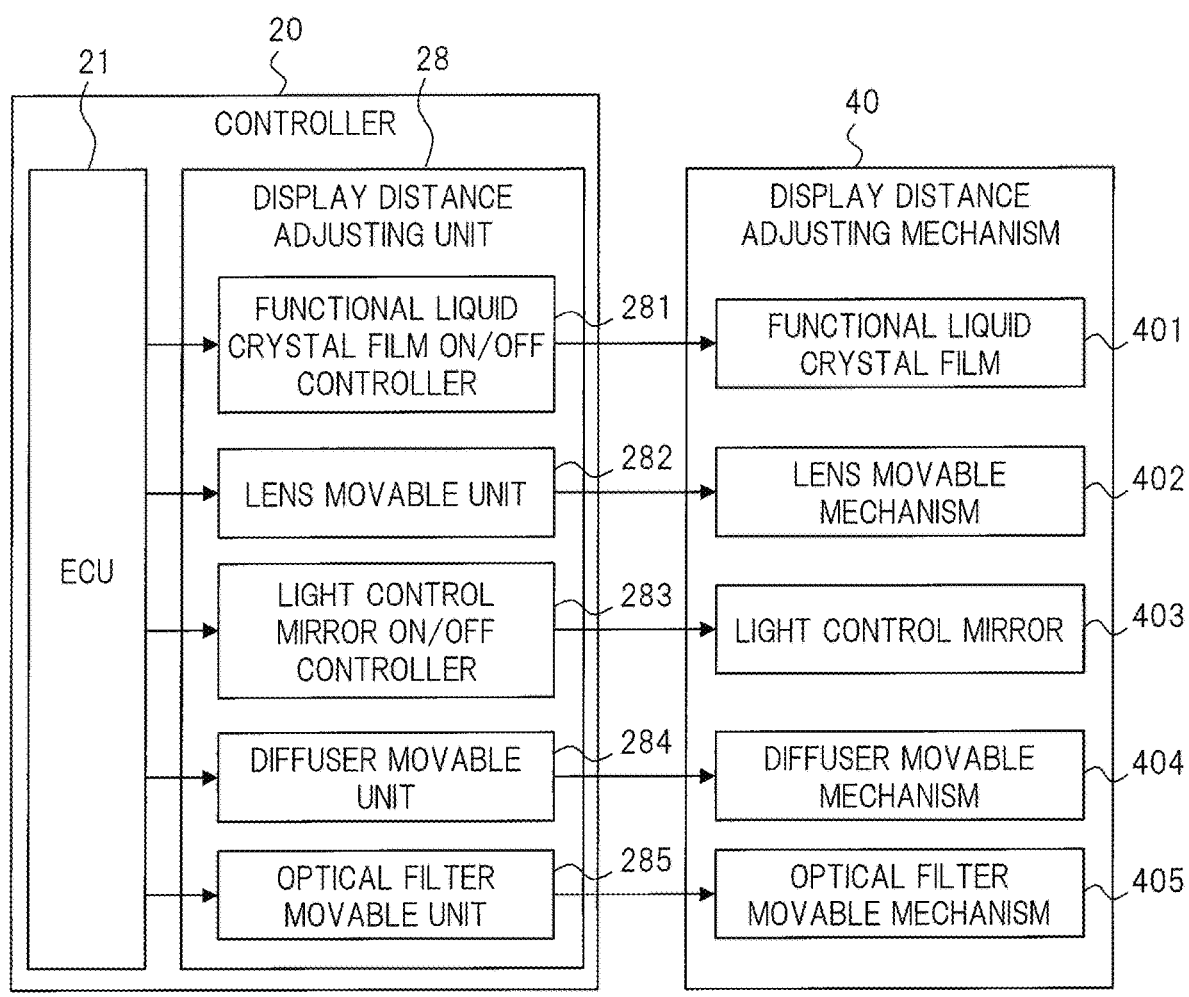
FIG. 5 is a view illustrating details of a configuration example relating to display distance adjustment according to the one embodiment of the present invention.

FIG. 5 is a view illustrating details of a configuration example relating to display distance adjustment in the head-up display apparatus of the present embodiment. The display distance adjusting unit 28 of the controller 20 further includes, as each unit controlled individually by the ECU 21, a functional liquid crystal film ON/OFF controller 281, a lens movable unit 282, alight control mirror ON/OFF controller 283, a diffuser movable unit 284, and an optical filter movable unit 285, for example. Also, as hardware, devices, and the like controlled and driven by these units, the display distance adjusting mechanism 40 further includes a functional liquid crystal film 401, a lens movable mechanism 402, a light control mirror 403, a diffuser movable mechanism 404, an optical filter movable mechanism 405, and the like. Adjusting method of the display distance of the virtual image by each of these units will be described later.

Note that the AR-HUD 1 does not need to include all of these respective units, devices, and the like, and it is sufficient if each unit required for mounting applicable one of the adjusting methods of the display distance of the virtual image described later may be appropriately provided.

<Contents of Processes>

Figure 6:
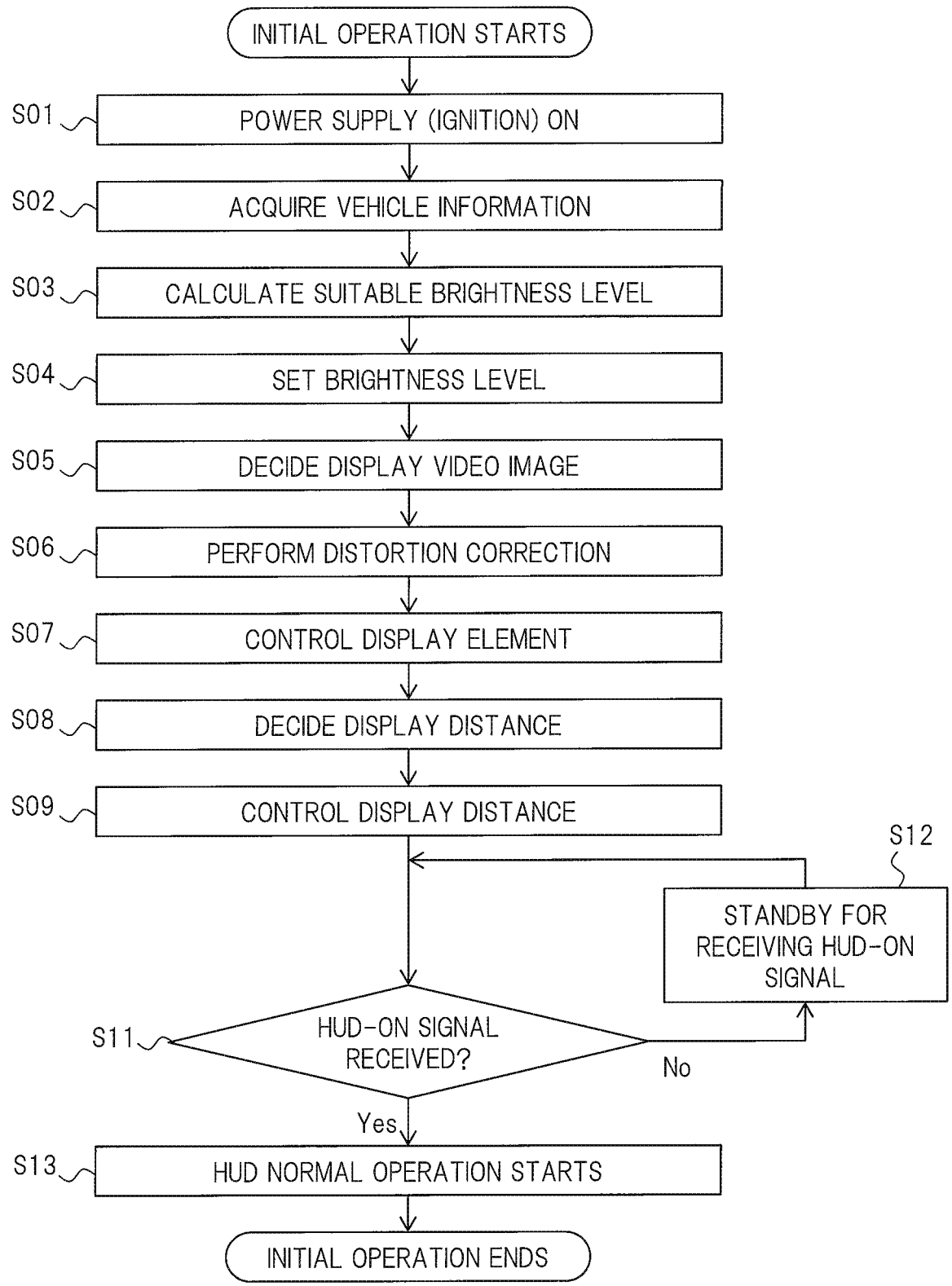
FIG. 6 is a flow chart illustrating an outline of an example of an initial operation according to the one embodiment of the present invention.

FIG. 6 is a flow chart illustrating an outline of an example of an initial operation in the head-up display apparatus of the present embodiment. When an ignition switch is turned ON in the vehicle 2 during stopping and a power supply of the AR-HUD 1 is then turned ON (S01), the AR-HUD 1 first acquires vehicle information by the vehicle information acquisition unit 10 based on an instruction from the controller 20 (S02). Then, the controller 20 calculates a suitable brightness level based on external light information acquired by the illuminance sensor 105, the chromaticity sensor 106, and the like, of the vehicle information 4 (S03) and has the light source adjusting unit 25 control a light emitting amount of the light source 31 to set such that the brightness level becomes the calculated brightness level (S04). For example, when the external light is bright, the brightness level is set to high, and when the external light is dark, the brightness level is set to low.

Subsequently, the ECU 21 decides and generates a video image (an initial image, for example) to be displayed as the virtual image (S05), and after a process of correcting a distortion of the generated video image by the distortion correction unit 26 is performed (S06), the display element driver 27 drives and controls the display element 33 to form a video image to be projected (S07). As a result, the video image is projected onto the windshield 3, so that the driver 5 can visually recognize the virtual image. Subsequently, the ECU 21 or the display distance adjusting unit 28 calculates and decides the display distance of the virtual image (S08), and the display distance adjusting unit 28 drives the display distance adjusting mechanism 40 to control the display distance of the video image projected from the video image display 30 (S09).

When the entire AR-HUD 1 has completed activation and start of each unit also including a series of initial operation described above, an HUD-ON signal is output, and the controller 20 determines whether or not this signal is received (S11). When this signal is not received, the controller 20 continues to standby for receiving the HUD-ON signal for a certain period of time (S12) and repeats a standby process of receiving the HUD-ON signal (S12) until it is determined that the HUD-ON signal is received in the step S11. When it is determined that the HUD-ON signal is received in the step S11, normal operation of the AR-HUD 1 described later starts (S13), and a series of initial operation ends.

Figure 7:
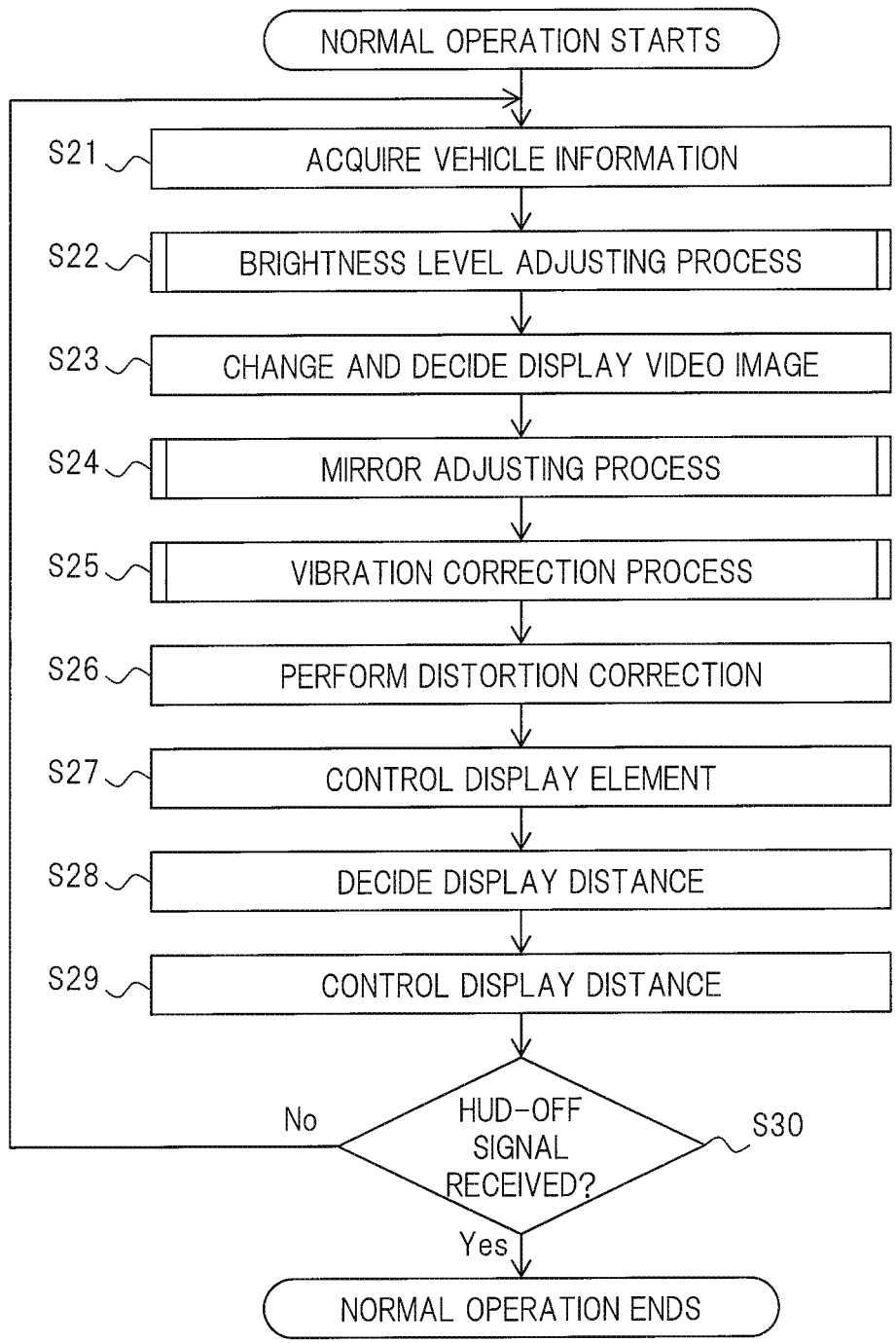
FIG. 7 is a flow chart illustrating an outline of an example of normal operation according to the one embodiment of the present invention.

FIG. 7 is a flow chart illustrating an outline of an example of normal operation in the head-up display apparatus of the present embodiment. Also in the normal operation, basic flow of processes is substantially the same as the initial operation illustrated in FIG. 6 described above. First, the AR-HUD 1 acquires vehicle information by the vehicle information acquisition unit 10 based on an instruction from the controller 20 (S21). Then, the controller 20 performs a brightness level adjusting process based on external light information acquired by the illuminance sensor 105, the chromaticity sensor 106, and the like, of the vehicle information 4 (S22).

Figure 8:
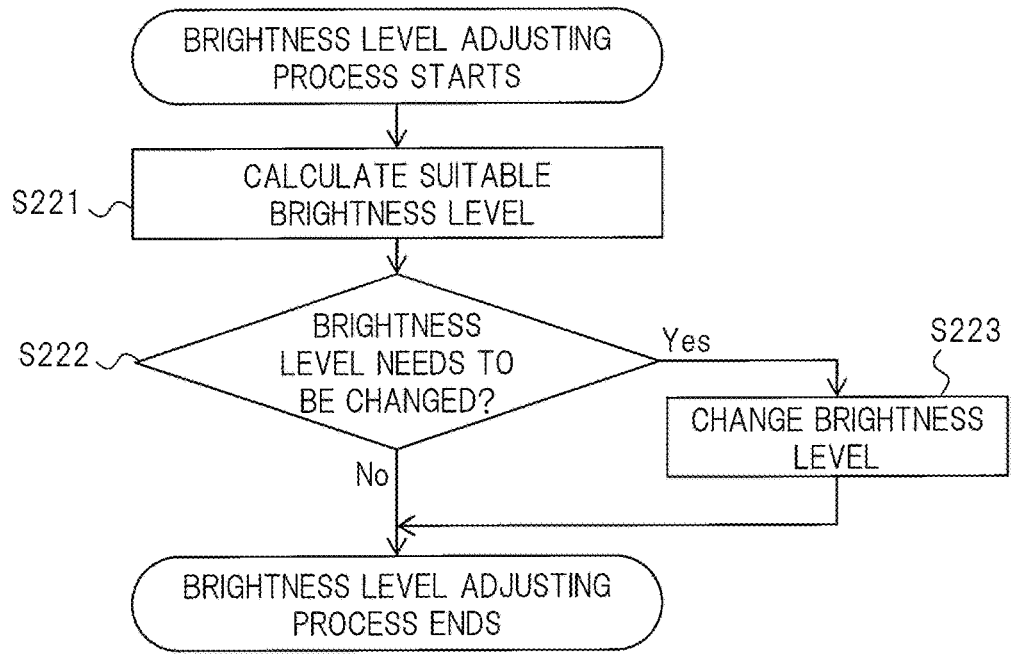
FIG. 8 is a flow chart illustrating an outline of an example of a brightness level adjusting process according to the one embodiment of the present invention.

FIG. 8 is a flow chart illustrating an outline of an example of the brightness level adjusting process in the head-up display apparatus of the present embodiment. When the brightness level adjusting process starts, first, a suitable brightness level is calculated based on the acquired external light information (S221). Then, by comparing the calculated brightness level with the brightness level currently set, it is determined whether or not the brightness level needs to be changed (S222). When the change is not necessary, the brightness level adjusting process ends as it is. Conversely, when the change is necessary, the light source adjusting unit 25 controls the light emitting amount of the light source 31 to set such that the brightness level becomes the brightness level after the change (S223), and the brightness level adjusting process ends. Note that, in the step S222, even when there is difference between the suitable brightness level calculated in the step S221 and the brightness level currently set, it may be determined that the brightness level needs to be changed only when the difference is a predetermined threshold value or more.

Subsequently, returning to FIG. 7, a current video image to be displayed as a virtual image is changed based on the latest vehicle information 4 acquired in the step S21 by the ECU 21, as needed, and a changed video image is decided and generated (S23). Note that there may be a large number of patterns in which display contents are changed based on the vehicle information 4 in accordance with contents of the acquired vehicle information 4, a combination thereof, etc. For example, various patterns may be possible; a case in which numeral values of speed display which are displayed all the time are changed when the speed information is changed or a case in which an arrow figure for guide is displayed or deleted based on the navigation information or in which a shape, a display position, or the like of the arrow are changed.

Subsequently, in the present embodiment, adjustment and correction processes for maintaining visibility, suitability of the display contents, and the like are performed in accordance with the running condition of the vehicle 2. First, when it is required to adjust a position of the display region of the virtual image itself, an angle of the mirror 52 is changed via the mirror driver 50, and the mirror adjusting process of moving the display region of the virtual image up and down is performed (S24). Subsequently, the vibration correction process of correcting the display position of the video image in the display region with respect to vibration of the vehicle 2 is further performed (S25). Detailed contents of the adjustment and correction processes in the steps S24 and S25 will be described later.

Subsequently, after a process of correcting a distortion of the adjusted and corrected video image is performed by the distortion correction unit 26 (S26), the display element driver 27 drives and controls the display element 33 to form a video image to be projected (S27). Then, the ECU 21 or the display distance adjusting unit 28 calculates and decides the display distance of the virtual image (S28), and the display distance adjusting unit 28 drives the display distance adjusting mechanism 40 to control the display distance of the video image projected from the video image display 30 (S29).

In executing a series of normal operation described above, the power supply is turned OFF in association with stopping of the vehicle 2, the HUD-OFF signal is output to the AR-HUD 1, and the controller 20 determines whether or not this signal is received (S30). When the HUD-OFF signal is not received, the process returns to the step S21, and the series of normal operation is repeated until the HUD-OFF signal is received. When it is determined that the HUD-OFF signal is received, the series of normal operation ends.

<Mirror Adjusting Process>

Figure 9:
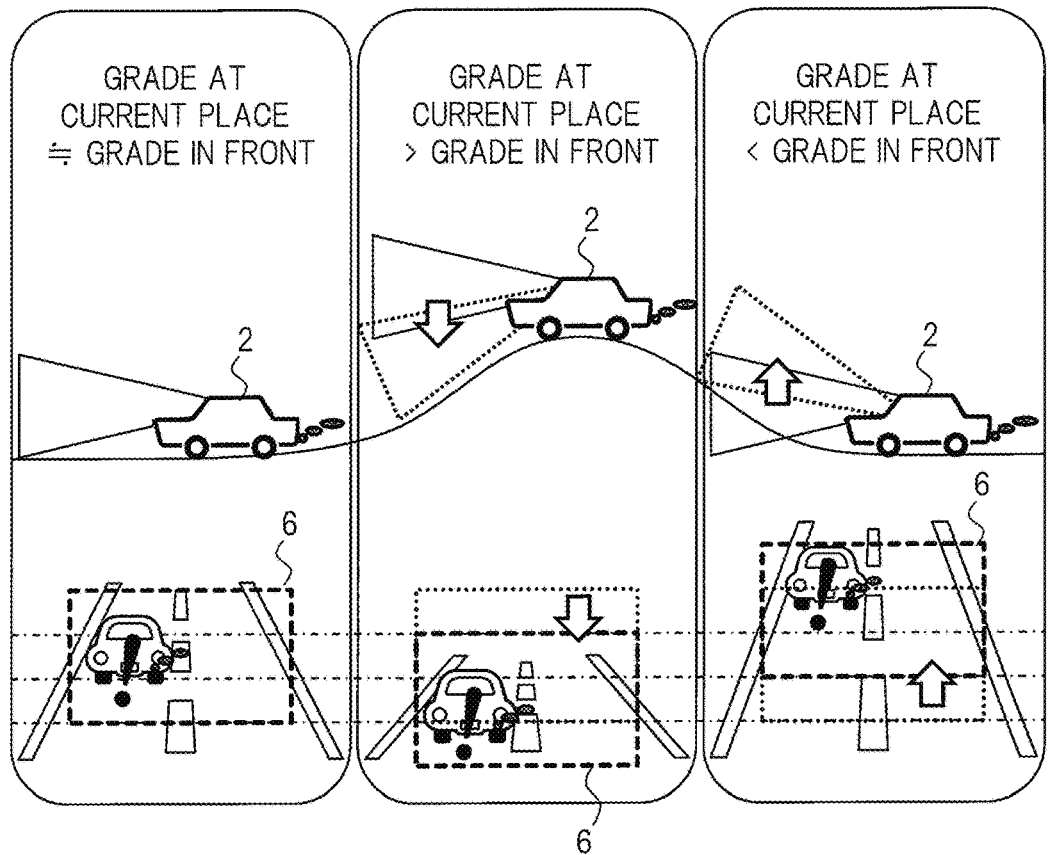
FIG. 9 is a diagram illustrating an outline of an example of adjusting a position of a display region of a virtual image up and down according to the one embodiment of the present invention.

FIG. 9 is a diagram illustrating an outline of an example of adjusting a position of the display region of the virtual image up and down in the head-up display apparatus of the present embodiment. For example, in each of the left, the center, and the right figures, a state in which a condition of a grade of a road on which the vehicle 2 is running and a condition of a line of sight of the driver 5 are seen in a side view is schematically illustrated on an upper part. Also, on a lower part, in each state, forward scenery outside the vehicle which is seen by the driver 5, and a condition of a position of the display region 6 (a rectangle frame of a broken line) of the virtual image which is displayed to be overlapped with the forward scenery are schematically illustrated.

In the left figure, as illustrated in the upper part thereof, a case in which the grade of the road at the current place of the vehicle 2 (in an advancing direction) and the grade of the forward road (in the advancing direction) are substantially the same, that is, a case in which the vehicle 2 is running on the road which is substantially flat is illustrated. In this case, as illustrated in the lower part of the figure, in order to display the virtual image (an exclamation mark or an image in the example of FIG. 9) to be overlapped with the forward scenery outside the vehicle (a forward vehicle running on the road in the example of FIG. 9) by the AR function, a position in the upward and downward direction of the display region 6 of the virtual image may remain a normal state. That is, the position of the display region 6 illustrated in the lower part of the left figure becomes a basic display position in the upward and downward direction of the display region 6.

In contrast, in the center figure, a case in which the grade of the road at the current place of the vehicle 2 (in the advancing direction) is larger than the grade of the forward road (in the advancing direction), that is, a case in which the vehicle 2 is running on the road where the forward road is a descending slope is illustrated. In this case, as illustrated in the upper part thereof, in order to put the forward road in a field of view of the driver 5 with respect to a height of the field of view of the driver 5 (a frame of a solid line in the figure) based on the grade at a position of the vehicle 2, the field of view needs to be moved in the downward direction (a frame of a dotted line in the figure). Then, in this case, as illustrated in the lower part of this figure, if the display position of the display region 6 of the virtual image remains in the basic display position (a rectangle of the dotted line), it is not possible to overlap the virtual image with the forward scenery outside the vehicle by the AR function, and accordingly, it is required to move the display region 6 itself in the downward direction in order to display in the overlapping manner.

Similarly, in the right figure, a case in which the grade of the road at the current place of the vehicle 2 (in the advancing direction) is smaller than the grade of the forward road (in the advancing direction), that is, a case in which the vehicle 2 is running on the road where the forward road is an ascending slope is illustrated. In this case, as illustrated in the upper part of the figure, in order to put the forward road in the field of view of the driver 5 with respect to the height of the field of view of the driver 5 (a frame of the solid line in the figure) based on the grade at a position of the vehicle 2, the field of view needs to be moved in the upward direction (a frame of the dotted line in the figure). Then, also in this case, as illustrated in the lower part of this figure, if the display position of the display region 6 of the virtual image remains in the basic display position (a rectangle of the dotted line), it is not possible to overlap the virtual image with the forward scenery outside the vehicle by the AR function, and accordingly, it is required to move the display region 6 itself in the upward direction in order to display in the overlapping manner.

Thus, the condition in which the position of the display region 6 of the virtual image needs to be moved in the upward and downward direction in accordance with the running condition is not limited to a case in which there is a certain amount or more of a difference between the grade at the current place and the grade on the forward road illustrated in the example of FIG. 9. For example, when the speed of the vehicle 2 increases on an expressway or the like, the line of sight of the driver 5 generally sees farther, comparing to the time of normal driving, and accordingly, the height of the field of view moves in the upward direction. Accordingly, for example, in order to overlap the virtual image with scenery outside the vehicle including other vehicles etc. which are present further ahead of the forward vehicle comparing to the time of normal driving, a need to move the display region 6 in the upward direction may be generated. The same also applies to a case or the like in which, when a posture and a body position of the driver 5 change in running the vehicle 2, for example, the height position of the eyes of the driver 5 itself changes, and as a result, the height of the field of view moves in the upward and downward direction.

In the present embodiment, in the mirror adjusting process in the step S24 of FIG. 7 described above, an angle of the mirror 52 is controlled by the mirror driver 50 in accordance with the running condition of the vehicle 2, and the position of the display region of the virtual image in the upward and downward direction is adjusted as illustrated in the example of FIG. 9.

Figure 10:
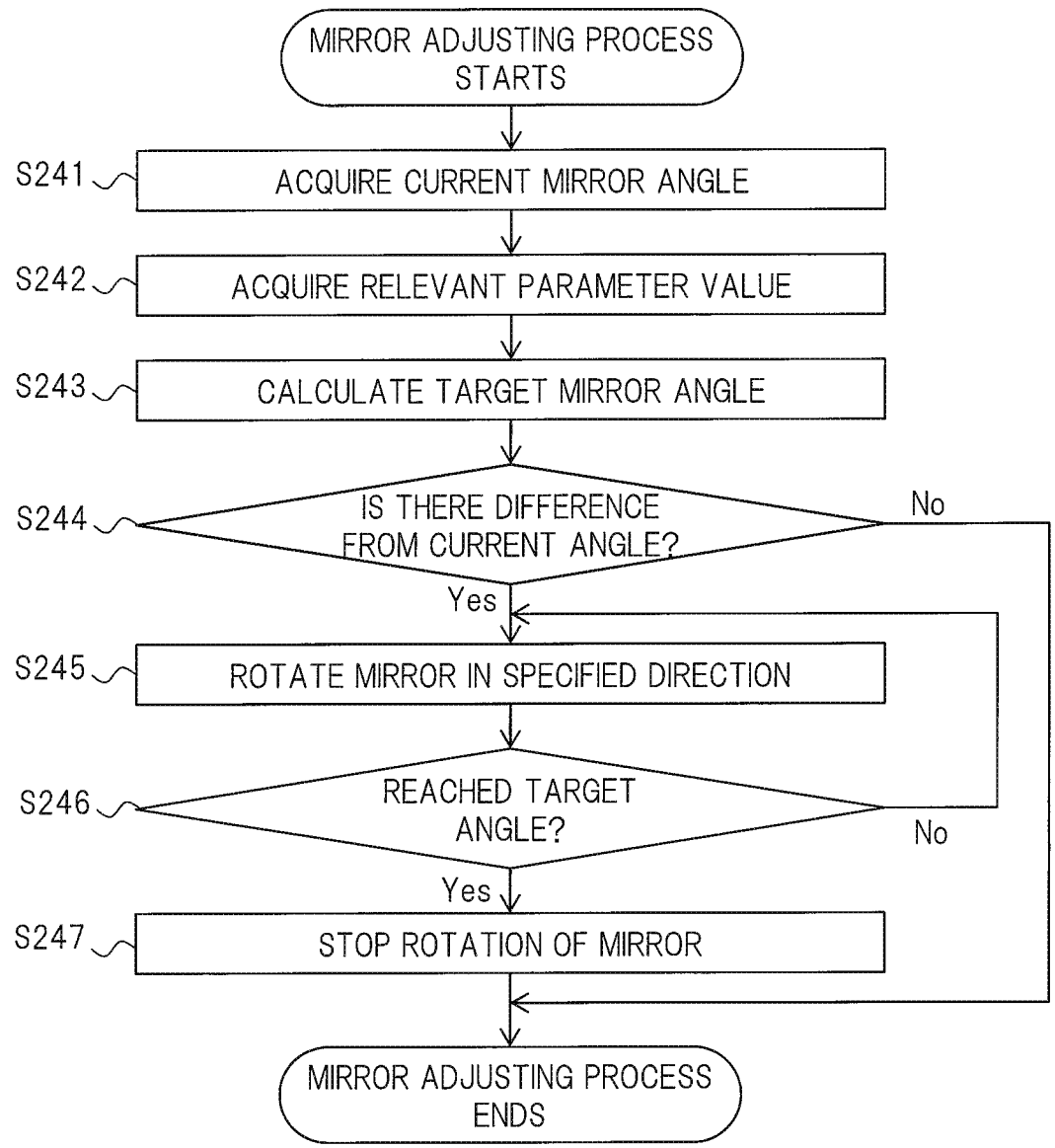
FIG. 10 is a flow chart illustrating an outline of an example of a mirror adjusting process according to the one embodiment of the present invention.

FIG. 10 is a flow chart illustrating an outline of the example of the mirror adjusting process in the step S24 of FIG. 7. When the mirror adjusting process starts, a current angle of the mirror 52 is first acquired (S241), and further, based on the vehicle information 4, a current value of a parameter relevant to adjustment of the angle of the mirror 52 (that is, adjustment of the display position of the display region of the virtual image) is acquired (S242).

A kind of parameter to be required may be different depending on under what conditions the display position of the display region is adjusted. For example, in the example of FIG. 9, as the relevant parameter value, a value indicating a difference between the grade at the current place of the vehicle 2 and the grade of the forward road (relative grade) is acquired. For example, it is possible to grasp the grade at the current place from information on an inclination of the vehicle 2 obtained by the acceleration gyro information. Also, by analyzing the camera video image information outside the vehicle, it is also possible to grasp the grade of the forward road. In addition, it is also possible to obtain the grades of the current place and the forward road based on three-dimensional road and topographical information and the like obtained from the navigation information.

Next, based on the parameter value acquired in the step S242, a target angle of the mirror 52 is calculated based on a reference, a condition, etc. determined in advance (S243). A kind of logic used to calculate the target angle based on the parameter may vary depending on the condition in which the display position of the display region is adjusted. For example, in the example of FIG. 9, when an absolute value of the relative grade between the current place and the forward road is a predetermined threshold value or more, the target angle of the mirror 52 is decided in accordance with a reference character of the relative grade. The predetermined threshold value described above can be set to, for example, $1/x$ (x is a predetermined value) of an FOV (Field Of View) of the display region of the virtual image in the upward and downward direction.

Note that, in the present embodiment, although it is configured such that the target angle of the mirror 52 is calculated based on the current parameter value acquired in the step S242, a condition in the near future is predicted based on information of history of the current parameter value and past values, and the target angle may be calculated based on the predicted result. For example, by analyzing a tendency of a transition of the values based on the history of the parameter values in the past, the parameter value in the near future may be predicted based on the tendency. Also, by analyzing the camera video image information ahead of and outside the vehicle, it is also possible to predict a condition around the vehicle 2 in the near future and to grasp a road condition ahead of the vehicle 2 based on the navigation information.

Next, presence/absence of a difference between the current angle of the mirror 52 acquired in the step S241 and the target angle of the mirror 52 acquired in the step S243 is determined (S244). Upon determination, for example, when the difference is a predetermined threshold value or more, it may be determined that the difference is present, and when the difference is less than the threshold value, it may be determined that the difference is not present. Also, it may be determined that the difference is present only if the state in which the difference is present continues for a certain period of time or more. Accordingly, it is possible to eliminate, from an object for adjustment of the mirror 52, an event in which the inclination of the vehicle 2 changes temporarily and instantaneously, for example, a case in which the vehicle 2 runs on a step such as a curb.

When it is determined that the difference in angle is not present in the step S244, the mirror adjusting process ends as it is. That is, the angle of the mirror 52 is not adjusted but remains the current angle. In contrast, when it is determined that the difference in angle is present, the mirror 52 is rotated in a specified direction so as to be the target angle (S245). In particular, a mirror adjusting signal for rotating the mirror 52 is output to the mirror driver 50. Then, it is determined whether or not the mirror 52 has reached the target angle (S246), and when it hasn't reached, the process returns to the step S245, and the rotation of the mirror 52 continues. That is, the mirror adjusting signal continues to be output to the mirror driver 50. In contrast, when the mirror 52 has reached the target angle, rotation of the mirror 52 is stopped (S247). That is, output of the mirror adjusting signal to the mirror driver 50 is stopped. Then, a series of mirror adjusting processes ends.

<Vibration Correction Process>

Figure 11:
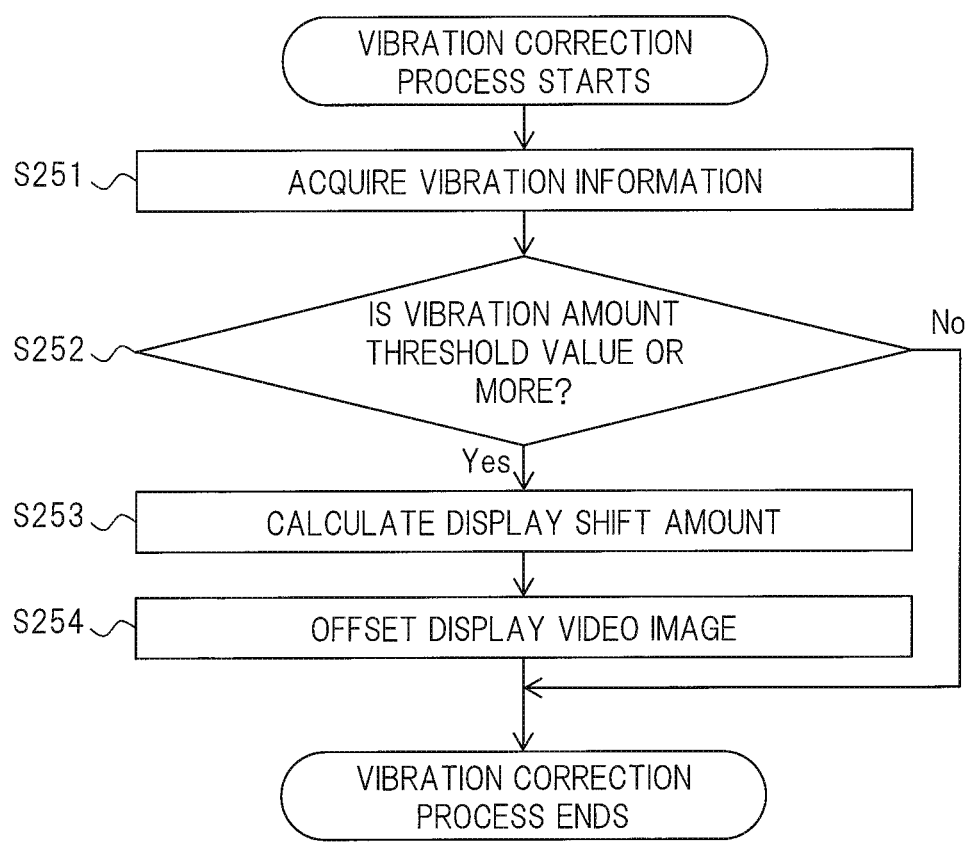
FIG. 11 is a flow chart illustrating an outline of an example of a vibration correction process according to the one embodiment of the present invention.

FIG. 11 is a flow chart illustrating an outline of an example of the vibration correction process in the step S25 of FIG. 7. When the vibration correction process starts, information on a vibration amount of the vehicle 2 is first acquired based on the vehicle information 4 (S251). For example, it is possible to grasp the vibration amount (an amount of an up-and-down motion in a short cycle in the vehicle 2) based on the acceleration gyro information, the camera video image information outside the vehicle, and the like. Note that, in the present embodiment, although the vibration information is acquired based on the current vehicle information 4, for example, by analyzing the camera video image information ahead of and outside the vehicle, a condition of a road surface around the vehicle 2 in the near future is predicted, and based on this, it may be configured to predict the vibration amount of the vehicle 2 in the near future.

Subsequently, it is determined whether or not the vibration amount acquired in the step S251 is a predetermined threshold value or more (S252). When the vibration amount is less than the threshold value, it is determined that the vibration is very small, and the vibration correction process ends as it is. That is, correction of the display video image in association with the vibration is not performed. In contrast, when the vibration amount is the threshold value or more, a display shift amount of the video image in the display region is calculated (S253). For example, based on a ratio between an actual height of the vehicle 2 and a height of the display region of the virtual image, the display shift amount of the video image in the display region is calculated from the vibration amount of the vehicle 2. Then, based on the calculated display shift amount, the display position of the video image in the display region is offset up and down (S254), and a series of vibration correction process ends.

<Display Distance Adjustment of Virtual Image>

When the display distance of the virtual image needs to be adjusted, the display distance adjusting unit 28 of the controller 20 drives the display distance adjusting mechanism 40 to adjust the display distance of the video image projected from the video image display 30. In the following, an adjusting method of the display distance of the virtual image in each unit of the display distance adjusting unit 28 and the display distance adjusting mechanism 40 illustrated in FIG. 5 will be described below.

<Functional Liquid Crystal Film>

FIGS. 12(*a*) and 12(*b*) are views illustrating an outline of an example of display distance adjustment using a functional liquid crystal film 401 in the head-up display apparatus of the present embodiment. In the example of FIG. 12, a plurality of the functional liquid crystal films 401 are used as a diffuser 41*a*. Then, as illustrated in each of FIGS. 12 (*a*) and 12(*b*), by changing a portion in a white state for each area of each of the functional liquid crystal films 401, a focus distance is changed for each area, so that the display distance of the virtual image (a distance between a position of the eyes of the driver 5 and the display position of the virtual image) is changed.

FIG. 13 is a view illustrating an outline of a configuration example of the diffuser 41*a* constituted by the functional liquid crystal films 401. The functional liquid crystal film 401 is a film capable of controlling a transmitted state and the white state by electricity. A part in the white state of the functional liquid crystal film 401 serves a function of the diffuser, and the video image projected by a projector 30*a* is formed at this part in the white state. In this present embodiment, it is assumed to control the plurality of functional liquid crystal films 401 so as to individually become the white state for each of a plurality of areas.

Returning to FIG. 12, in a configuration illustrated in the figure, the display position of the virtual image based on the video image projected from the projector 30*a* is decided in accordance with the distance between the part in the white state of each of the functional liquid crystal films 401 and the lens 42*a*. Accordingly, the plurality of functional liquid crystal films 401 are disposed such that the distance from each of the functional liquid crystal films 401 to the lens 42*a* becomes different, and regarding the video image projected from the projector 30*a*, any one of the functional liquid crystal films 401 is set in the white state for each area by the functional liquid crystal film ON/OFF controller 281 illustrated in FIG. 5, so that the display distance of the virtual image can be changed for each area.

In particular, for example, as illustrated in FIG. 12(*b*), for a subject area (an uppermost area, for example), only the functional liquid crystal film 401 which is disposed at the closest position to the lens 42*a* is set in the white state, and the other functional liquid crystal films 401 are set in the transmitted state, so that the display distance of the corresponding virtual image can be shortest. Conversely, as illustrated in FIG. 12(*a*), for the subject area (the uppermost area, for example), only the functional liquid crystal film 401 which is disposed at the farthest position from the lens 42*a* is set in the white state, and the other functional liquid crystal films 401 are set in the transmitted state, so that the display distance of the corresponding virtual image can be farthest.

Note that, although a case in which the video image to be displayed is provided with three areas in the upward and downward direction is exemplified in the examples of FIGS. 12 and 13, the number of areas is not limited to this also including examples to be described below, and the areas can be divided not only in the upward and downward direction, but also in the right and left direction as a matter of course. Also, the number of functional liquid crystal films 401 is also not limited to three illustrated in the figures and can be appropriately changed in accordance with the number of areas.

<Disposition of Plurality of Mirrors>

FIG. 14 is a view illustrating an outline of an example of display distance adjustment using a plurality of mirrors in the head-up display apparatus of the present embodiment. In the example of FIG. 14, a plurality of mirrors 51*a* are disposed between an LCD 30*b* and the lens 42*a* as illustrated, and a video image from the LCD 30*b* is reflected by each of the mirrors 51*a* which is different for each area to be incident on the lens 42*a*. Accordingly, a distance from the LCD 30*b* to the lens 42*a* is made different for each area, so that the display distance of the virtual image can be changed in accordance with this distance.

In particular, for example, as illustrated in FIG. 14, by displaying the video image on the LCD 30*b* in the area reflected by the mirror 51*a* (which is also the farthest from the lens 42*a*) disposed at the farthest position from the LCD 30*b*, it is possible to make the display distance of the corresponding virtual image farthest. Conversely, by displaying the video image on the LCD 30*b* in the area reflected by the mirror 51*a* (which is also the closest to the lens 42*a*) disposed at the closest position from the LCD 30*b*, it is possible to make the display distance of the corresponding virtual image closest.

Note that, also in the example of FIG. 14, the number of mirrors 51*a* is not limited to three illustrated in the figure, but can be appropriately changed in accordance with the number of areas.

[Movable Lens]

FIG. 15 is a view illustrating an outline of an example of display distance adjustment using a movable lens in the head-up display apparatus of the present embodiment. In the example of FIG. 15, the video image projected from the projector 30*a* is formed by a diffuser 41*b* and then, incident on the mirror 52 via movable lenses 42*b* separately provided in a plurality of areas.

Here, each of the movable lenses 42*b* can be individually moved along an optical axis direction by the lens movable unit 282 and the lens movable mechanism 402 illustrated in FIG. 5. The display position of the virtual image based on the video image projected from the projector 30*a* is decided in accordance with the distance between the diffuser 41*b* and each of the movable lenses 42*b*. Thus, moving the movable lens 42*b* changes the focus distance for each area, so that the display distance of the virtual image can be changed.

In particular, for example, as illustrated in FIG. 15, as in the uppermost area, the movable lens 42*b* is moved to a position close to the diffuser 41*b*, so that it is possible to make the display distance of the corresponding virtual image closer. Conversely, as in the lowermost area, the movable lens 42*b* is moved to a position far from the diffuser 41*b*, so that it is possible to make the display distance of the corresponding virtual image farther.

Note that, also in the example of FIG. 15, the number of movable lenses 42*b* is not limited to three illustrated in the figure, but can be appropriately changed in accordance with the number of areas.

[Light Control Mirror]

FIGS. 16(*a*) and 16(*b*) are views illustrating an outline of an example of display distance adjustment using a light control mirror 51*b* in the head-up display apparatus of the present embodiment. In the example of FIG. 16, a plurality of light control mirrors 403 are disposed between the LCD 30*b* and the lens 42*a* so as to be in rows and columns when seen in a sectional direction as illustrated in the figures, thereby constituting the light control mirror 51*b*. Then, as illustrated in FIGS. 16(*a*) and 16(*b*), changing a portion of the light control mirrors 403 to be set in the mirror state makes the distance from the LCD 30*b* to the lens 42*a* different for each area, and in accordance with this distance, it is possible to change the display distance of the virtual image.

FIG. 17 is a view illustrating an outline of a configuration example of the light control mirror 403. The light control mirror 403 is a component such as a film, a sheet, or a glass capable of controlling the transmitted state and the mirror state by electricity. The light control mirror 403 in the transmitted state transmits the video image from the LCD 30*b*, and only the light control mirror 403 in the mirror state reflects the video image in a direction of the lens 42*a*. In the present embodiment, it is assumed that the plurality of light control mirrors 403 disposed in rows and columns when seen in a sectional direction are controlled by the light control mirror ON/OFF controller 283 such that one light control mirror 403 only becomes the mirror state per a row and a column (each area).

In particular, for example, as illustrated in FIG. 16(*a*), for an area corresponding to a column of the light control mirrors 403 which is closest to the lens 42*a*, only the light control mirror 403 in the lowermost row is set to the mirror state, and the other light control mirrors 403 are set to the transmitted state, so that an optical path length from the LCD 30*b* to the lens 42*a* can be made shortest, whereby the display distance of the corresponding virtual image can be made closest. Conversely, for an area corresponding to a column of the light control mirrors 403 which is farthest from the lens 42*a*, only the light control mirror 403 in the uppermost row is set to the mirror state, and the other light control mirrors 403 are set to the transmitted state, so that an optical path length from the LCD 30*b* to the lens 42*a* can be made longest, whereby the display distance of the corresponding virtual image can be made farthest.

Also, for example, as illustrated in FIG. 16(*b*), for an area corresponding to a column of the light control mirrors 403 which is closest to the lens 42*a*, only the light control mirror 403 in the uppermost row is set to the mirror state, and for an area corresponding to a column of the light control mirrors 403 which is second closest to the lens 42*a*, only the light control mirror 403 in the lowermost row is set to the mirror state, and the other light control mirrors 403 are set to the transmitted state. Thus, optical path lengths from the LCD 30*b* to the lens 42*a* in these areas can be made relatively shorter, so that the display distances of the corresponding virtual images can be made closer. Conversely, for an area corresponding to a column of the light control mirrors 403 which is farthest from the lens 42a, only the light control mirror 403 in the middle row is set to the mirror state, and the other light control mirrors 403 are set to the transmitted state. As a result, an optical path length from the LCD 30b to the lens 42a can be made relatively longer than those in the other areas, so that the display distance of the corresponding virtual image can be made farther.

Note that, also in the examples of FIGS. 16 and 17, the number of light control mirrors 403 is not limited to three rows and three columns illustrated in the figures, but can be appropriately changed in accordance with the number of areas.

[Movable Diffuser]

FIG. 18 is a view illustrating an outline of an example of display distance adjustment using a movable diffuser in the head-up display apparatus of the present embodiment. In the example of FIG. 18, the video image projected from the projector 30a is formed by a movable diffuser 41c and then, incident on the mirror 52 via the lens 42a.

Here, the movable diffuser 41c can be moved and/or rotated along the optical axis direction by the diffuser movable unit 284 and the diffuser movable mechanism 404 illustrated in FIG. 5. The display position of the virtual image based on the video image projected from the projector 30a is decided in accordance with a distance and/or an inclination between the movable diffuser 41c and the lens 42a. Thus, moving and/or rotating the movable diffuser 41c can change the focus distance, thereby changing the display distance of the virtual image.

In particular, by moving and/or rotating the movable diffuser 41c at a position close to the lens 42a, the display distance of the virtual image can be made closer. Conversely, by moving and/or rotating the movable diffuser 41c at a position farther from the lens 42a, the display distance of the virtual image can be made farther.

[Movable Optical Filter]

FIGS. 19(a) and 19(b) are views illustrating an outline of an example of display distance adjustment using a movable optical filter in the head-up display apparatus of the present embodiment. In the examples of FIG. 19, the movable optical filter 43a is provided between the lens 42a and the diffuser 41b, and as illustrated in FIGS. 19(a) and 19(b), the movable optical filter 43a is inserted into or extracted from the optical path, thereby changing the focus distance for each area to change the display distance of the virtual image.

An optical filter is a component having a characteristic of changing a focus distance by a single optical member such as a lens or a combination. In the present embodiment, a plurality of optical filters each having a different refractive index are used in combination to form one optical filter having a different refractive index for each region, and at the same time, to constitute a movable optical filter 43a capable of being inserted into or extracted from the optical path. Since the focus distance of the optical filter is different for each region, the movable optical filter 43a is inserted into or extracted from the optical path by the optical filter movable unit 285 and the optical filter movable mechanism 405 illustrated in FIG. 5, so that the display distance of the virtual image can be changed for each area.

In particular, for example, as illustrated in FIG. 19(a), inserting the whole movable optical filter 43a into the optical path can make the focus distance of the optical filter corresponding to the lowermost area shortest and the display distance of the virtual image far, and at the same time, make the focus distance of the optical filter corresponding to the uppermost area longest and the display distance of the virtual image close. Also, for example, as illustrated in FIG. 19(b), the movable optical filter 43a is partially extracted such that the lowermost area does not pass through the optical filter, and accordingly, it is configured that the display distance of the virtual image can be decided by the distance between the diffuser 41b and the lens 42a for this area and the display distance of the virtual image in this area can be made farther than those in the other areas which pass through the optical filter.

Note that, also in the examples of FIG. 19, the number of regions whose focus distances in the movable optical filter 43a are different is not limited to three illustrated in the figures, but can be appropriately changed in accordance with the number of areas.

[Comb-Like Optical Filter]

FIG. 20 is a view illustrating an outline of an example of display distance adjustment using a comb-like optical filter in the head-up display apparatus of the present embodiment. In the example of FIG. 20, the video image projected from the projector 30a is formed by the diffuser 41b and then, incident on the mirror 52 via a comb-like optical filter 43b and the lens 42a.

The comb-like optical filter 43b is a component whose optical filter portion having the same function as the lens and capable of changing the display distance of the virtual image in accordance with the focus distance is provided in a comb-like shape. As illustrated in FIG. 20, for example, the video image projected from the projector 30a is made to correspond to each of the optical filter portion and a portion without the optical filter by a line of the video image (which is not limited to each one line, but can be for each arbitrary line), so that the display distance of the virtual image can be changed by a line.

In particular, the display distance of the virtual image based on the video image of the line corresponding to the optical filter portion can be made closer, and the display distance of the virtual image based on the video image of the line corresponding to the portion without the optical filter can be made farther.

As described above, according to the head-up display apparatus of the one embodiment of the present invention, in accordance with the running condition of the vehicle 2, even in a case in which it is not possible to overlap the virtual image with the scenery in front of the vehicle 2, the display position of the display region itself of the virtual image is adjusted dynamically in the upward and downward direction, so that the virtual image can be suitably overlapped with the scenery in front of the vehicle 2 to achieve the AR function. Further, in accordance with the running condition and the like, the display distance of the virtual image can be also suitably adjusted.

Note that the normal operation of the head-up display apparatus of the embodiment described above in detail has been described assuming that a region for displaying the virtual image (see a reference character 6 in FIG. 9) is provided at a part within the field of view ahead of the vehicle 2 seen via the windshield 3 and is divided into a plurality of regions (three regions, for example) in a vertical direction to display the virtual image in each of the regions, the display distance of the virtual image in each of the regions is calculated and decided by the display distance adjusting unit 28 (see the step S28 in FIG. 7), and the display distance adjusting unit 28 drives the display distance adjusting mechanism 40 to control the display distance of the video image projected from the video image display 30 (see the step S29 in FIG. 7).

In the following, a display method of the virtual image and distance control therefor will be described in more detail with reference to the drawings.

<Display Distance Control of Virtual Image by Vergence Angle Etc.>

First, a problem caused by a difference in focus distance of the driver while driving will be described with reference to FIG. 21.

In this figure, when an object which the driver sees (a focus of the driver) is positioned at 5 m from an eye point which is the eyes of the driver 5 and at a depression angle directed downward to a horizontal surface of 8° (a PA point in this figure) while a position of the current virtual image displayed by the head-up display apparatus (in the present example, display of a running speed of "60 km") is at a depression angle of 4° and a distance of 7 m (a PB point in this figure), if the driver tries to check the running speed of the own vehicle, a focus position needs to be moved to the display position of the virtual image, whereby it is considered that this movement of the focus position causes fatigue and lower visibility of display of the virtual image for the driver. Also, when the driver drives under dim circumstances such as at night and in a tunnel, it is hard to visually recognize far, and accordingly, a visually recognized distance of the driver becomes inevitably a close distance. Thus, it became clear that display of the virtual image may be performed only at a position having a relatively close distance (substantially 10 m) under such dim circumstances. Meanwhile, it became clear that display of the virtual image may be performed at a far distance of substantially 10 to 100 m, under bright circumstances such as in the daytime.

Thus, in the following embodiment, provided is display distance control of the virtual image which is made based on knowledge of the present inventors described above, in which the display distance of the virtual image is optimally controlled using a vergence angle of the driver, and further, in which control suitable under the running conditions of the vehicle described above is performed.

As generally known, as illustrated in FIG. 22, a vergence angle is a difference (θ2−θ1) in a visual direction (θ) to an object, which differs between the right eye and the left eye when seeing the object, that is, an angle between the right eye and the left eye when seen from the object. Note that this vergence angle can be detected by a camera attached to a back mirror in front of the driver or eyeglasses-type wearable terminal equipment, etc., for example.

Next, detailed contents of the display distance control of the virtual image by the above-described vergence angle and the like will be described with reference to a flow chart of FIG. 23.

When the display distance control starts, first, vergence angle information including the above-described vergence angle of the driver is acquired (S231). Then, a vergence distance (that is, a focus distance of the driver) is calculated from the acquired vergence angle (S232).

Then, the calculated vergence distance is compared with the current display distance of the virtual image (S233), and as a result, when it is determined that difference between the calculated vergence distance and the current display distance of the virtual image is present (Yes), after the current display distance of the virtual image is changed to the calculated vergence distance (S234), and on the other hand, when it is determined that difference between the calculated vergence distance and the current display distance of the virtual image is not present (No), the process proceeds to the next step as it is to acquire brightness of external light (S235). Note that the brightness of this external light can be obtained from the illuminance sensor 105 in FIG. 3 described above.

Further, in the next step, running road information is acquired from the navigation information indicated by the vehicle information in FIG. 1, for example (S236). Then, based on these pieces of information acquired, a maximum display distance is decided (S237).

Note that this maximum display distance is a value set in advance with respect to various kinds of brightness of external light and running road information, and by way of example, the maximum display distance is set in advance as a table illustrated in FIG. 24 and stored in a storage medium such as the memory 24 in the controller 20 in FIG. 4 described above.

Then, it is determined whether or not the display distance obtained above is the maximum display distance or more (S238). As a result of determination, when it is determined that the display distance obtained above is the maximum display distance or more (Yes), after the display distance obtained above is changed to the maximum display distance (S239), and on the other hand, when it is determined that the display distance obtained above is less than the maximum display distance (No), the process proceeds to the next step as it is to perform display distance control (S240), and a series of display distance calculation process ends.

That is, according to the display distance control of the virtual image by the vergence angle etc. described above in detail, it is possible to solve the problem caused by difference between the display distance of the virtual image and the focus distance of the driver while driving and to achieve the head-up display apparatus enabling display excellent in visibility and also adapted to a running condition of the vehicle.

Note that this software is, for example, stored in advance in a memory in the controller 20 and to be executed by the ECU 21 (see FIGS. 3 to 5, for example) in the process indicated in FIG. 7 described above.

<Display Method of Virtual Image and Distance Control by Eye Point>

First, in FIG. 25, a case in which the display distance of the virtual image is set onto the road surface ahead of the vehicle (that is, a height of a watching object of the driver 5 is 0 m) will be described. In this case, an elevation-depression angle from the eye point which is the eyes of the driver 5 changes as illustrated in Table 1 below, in accordance with changes in distance from the eye point (hereinafter, also referred to as "display distance") (for example, 5 m to 100 m). Note that, although a height of the eye point differs depending on a driver and a driving condition, the height of the eye point is assumed to be 1.2 m herein, by way of example.

TABLE 1

| Distance to Road Surface (m) | Elevation-Depression Angle (Degree) |
| --- | --- |
| 5 | 13.5 |
| 10 | 6.8 |
| 20 | 3.4 |
| 30 | 2.3 |
| 40 | 1.7 |
| 50 | 1.4 |
| 60 | 1.1 |
| 70 | 1.0 |
| 80 | 0.9 |
| 90 | 0.8 |
| 100 | 0.7 |

Note that, in Table 1, an angle of looking down the road surface from the eye point (that is, an angle with respect to the horizontal surface indicated with one-dot chain line in the figure) is defined as a "depression angle," while an angle of seeing above the horizontal surface from the eye point is indicated with a minus and defined as an "elevation angle."

When an angle is not referred to by particularly limiting to either of them, the angle is hereinafter represented as the elevation-depression angle.

As apparent from the above, when the height of the eye point of the driver 5 is decided, the elevation-depression angle with respect to the distance (display distance) to the road surface at which the virtual image is displayed is unambiguously decided to be easily calculated. Thus, using this elevation-depression angle enables the display distance of the virtual image to be optimally controlled even when the height of the eye point of the driver 5 changes.

FIG. 26 and FIG. 27 illustrate a display position changing process serving as one example for achieving control of the display distance of the virtual image by the height of the eye point described above, and a flow chart for calculation of display position describing this process in detail. Note that FIG. 26 indicates where the flow chart of FIG. 27 is executed in the flow chart of the normal operation of the head-up display apparatus illustrated in FIG. 7 described above, and particularly, the flow chart of FIG. 27 is executed in the step 23-1 between the step S23 and the step S24.

In this figure, when the display position calculation starts, first, the height of the eye point is acquired (S261). This height of the eye point can be acquired from the camera (inside the vehicle) 115 attached to the back mirror etc. (see FIG. 3) or a seat position, for example. Subsequently, a relation between the distance to the road surface and the elevation-depression angle is calculated (S262), and further, the current display distance and the elevation-depression angle are calculated (S263).

Subsequently, the current elevation-depression angle calculated above is compared with the elevation-depression angle of the road surface corresponding to the current display distance (calculated in the step S262) (S264). As a result, when it is determined that difference between the current elevation-depression angle and the elevation-depression angle of the road surface is not present ("No" in the step S265), a series of processes ends as it is, while, when it is determined that difference between the current elevation-depression angle and the elevation-depression angle of the road surface is present ("Yes" in the step S265), the elevation-depression angle to be displayed is changed to a position to be the elevation-depression angle of the road surface corresponding to the distance, and a series of processes ends. That is, according to the display position calculation described above, suitable display of the virtual image in which the display distance of the virtual image from the eye point corresponds onto the road surface can be achieved.

Note that this software is, for example, stored in advance in a memory in the controller 20 and to be executed by the ECU 21 (see FIGS. 3 to 5, for example) in the process indicated in FIG. 7 described above.

Also, as a display method of the virtual image of this case, first, as illustrated in FIG. 28(*a*), the virtual image may be displayed such that the display distance of the virtual image continuously changes from the downward to the upward in the HUD display region 35 in the windshield 3 (the region for displaying the virtual image. See the reference character 6 in FIG. 9).

Alternatively, when the distance (display distance) to the road surface displaying the virtual image is set in a stepwise manner (see A (100 m), B (30 m), and C (5 m) in FIG. 25), as illustrated in FIG. 28(*b*), the HUD display region 35 is divided into a plurality of regions (in the present example, three regions 35-1, 35-2, and 35-3) from the downward to the upward, and the display position of the virtual image to be displayed in each region can also be set to a fixed surface (position) displayed for each divided region similarly. Note that, when the HUD display region 35 is divided into a plurality of regions, an interval (distance) between the display regions is preferably secured to such an extent that optical path interference does not occur.

Also, in FIGS. 29(*a*) and 29(*b*), instead of the above example, the elevation-depression angle and the display distance when the display distance of the virtual image is set to a certain height from the road surface ahead of the vehicle will be described. Note that this setting is made in order that the scenery seen by the driver and a sense of distance of the virtual image may fit to each other, assuming that the driver often sees a license plate of the forward vehicle, a pedestrian, or the like.

More specifically, it is considered that the license plate of the forward vehicle which the driver will carefully watch is often attached at a position of typically 0.5 to 0.8 m from the road surface, and that, in the case of displaying an alert (virtual image) for warning and calling for attention to presence of a pedestrian on the forward road surface, it is suitable to perform an alert display at around the waist of the pedestrian, thereby taking into consideration that display of an alert having some degree of height is advantageous. Note that a relation between the elevation-depression angle and the display distance in this case will be indicated in the following Table 2.

TABLE 2

| Distance to Road Surface (m) | Elevation-Depression Angle (Degree) |
|---|---|
| 5 | 8.0 |
| 10 | 4.0 |
| 20 | 2.0 |
| 30 | 1.3 |
| 40 | 1.0 |
| 50 | 0.8 |
| 60 | 0.7 |
| 70 | 0.6 |
| 80 | 0.5 |
| 90 | 0.4 |
| 100 | 0.4 |

Note that, herein, the height of the eye point is assumed to be 1.2 m, and the height of the watching object is assumed to be 0.5 m.

Figure 29:
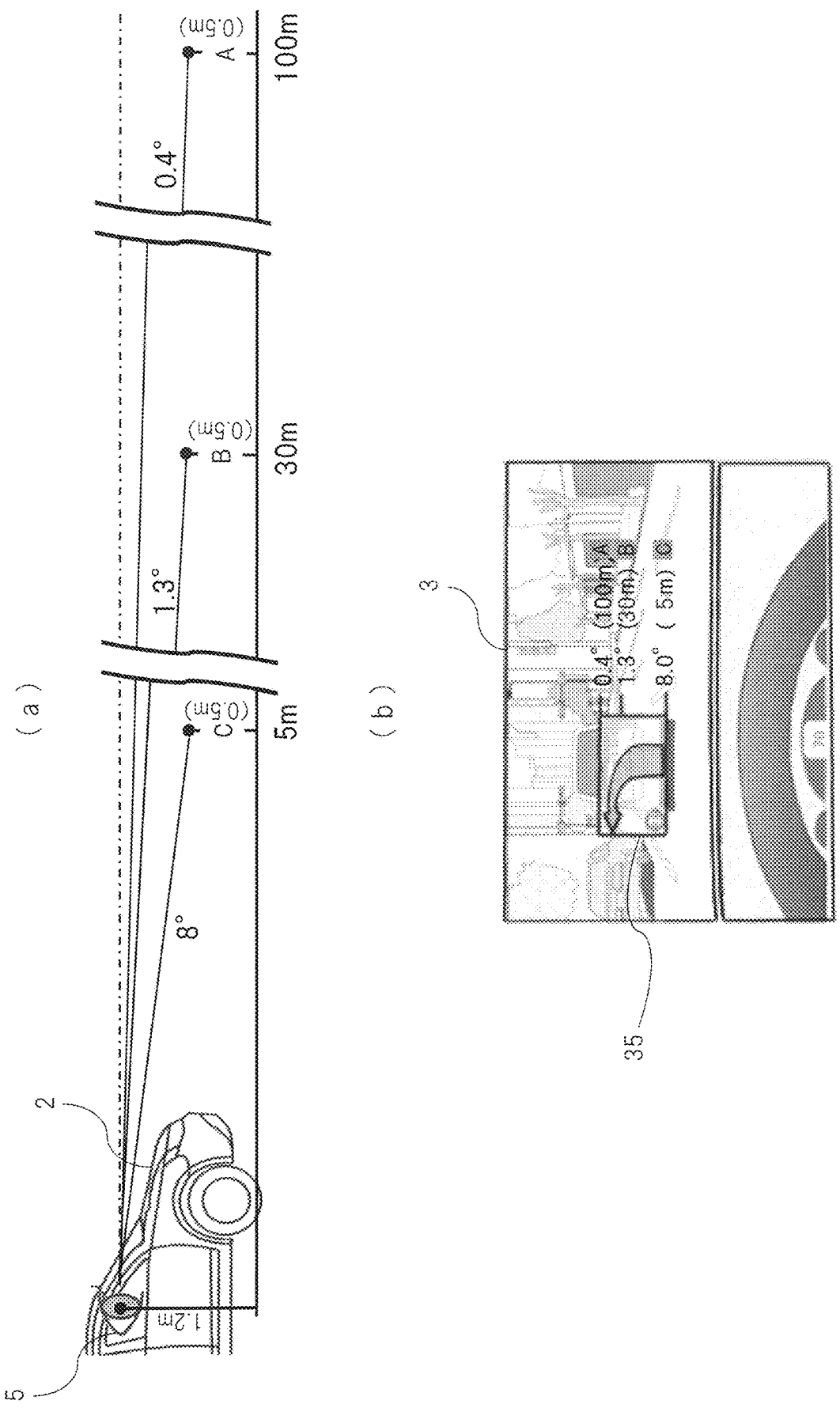

As a display method of the virtual image of this case, similarly to the above, as illustrated in FIG. 29(*b*), the virtual image may be displayed continuously in the HUD display region 35 in the windshield 3 or displayed in a stepwise manner by dividing the HUD display region 35 into a plurality of regions (not illustrated).

In addition, FIGS. 30(*a*) and 30(*b*) illustrate a case in which the height of the virtual image from the road surface to be displayed can be set arbitrarily for each display distance of the virtual image. That is, in the example of the figure, an example in which a height is set to 0.5 m in a point C (at a distance of 5 m), a height is set to 0.8 m in a point B (at a distance of 30 m), and a height is set to 1.5 m in a point A (at a distance of 100 m) is illustrated. This setting is made in order that a sense of distance between the scenery and the virtual image may fit to each other more suitably, when the driver sees not only the license plate, the pedestrian, or the like as described above but also other background. Note that a relation between the elevation-depression angle and the display distance of this case is indicated in the following Table 3.

TABLE 3

| Distance to Road Surface (m) | Elevation-Depression Angle (Degree) at Point A | Elevation-Depression Angle (Degree) at Point B | Elevation-Depression Angle (Degree) at Point C |
|---|---|---|---|
| 5 | 8.0 | 4.6 | −3.4 |
| 10 | 4.0 | 2.3 | −1.7 |
| 20 | 2.0 | 1.1 | −0.9 |
| 30 | 1.3 | 0.8 | −0.6 |
| 40 | 1.0 | 0.6 | −0.4 |
| 50 | 0.8 | 0.5 | −0.3 |
| 60 | 0.7 | 0.4 | −0.3 |
| 70 | 0.6 | 0.3 | −0.2 |
| 80 | 0.5 | 0.3 | −0.2 |
| 90 | 0.4 | 0.3 | −0.2 |
| 100 | 0.4 | 0.2 | −0.2 |

Note that the height of the eye point is also assumed to be 1.2 m herein.

Also as a display method of the virtual image of this case, similarly to the above, the virtual image may be displayed continuously in the HUD display region 35 in the windshield 3 (illustrated in FIG. 30(b)), or displayed in a stepwise manner by dividing the HUD display region 35 into a plurality of regions (not illustrated).

Note that, as a reason that the height from the road surface is changed for each display distance as illustrated above, when the height is fixed with respect to the distance of the watching object, the displayed objects of the virtual images are overlapped too much, thereby conversely reducing visibility, and to overcome this, it is required to shift the display position of the virtual image on purpose. As a more specific example, since a faraway vehicle and a faraway pedestrian, etc. which are the watching objects are seen in a small size, it is considerable to shift a display position (height) of an alert so as not to prevent visibility of them.

That is, the display method of the virtual image and the distance control by the eye point described above in detail enable more suitable adjustment of the display distance of the virtual image.

In the foregoing, the invention made by the present inventors has been concretely described based on the embodiments. However, it is needless to say that the present invention is not limited to the foregoing embodiments and various modifications and alterations can be made within the gist of the present invention. For example, the above-described embodiment has been described in detail so that the present invention is easily understood, and is not necessarily limited to the one including all configurations described. In addition, other configurations can be added to, deleted from, or replaced with the part of the configuration of each embodiment described above.

INDUSTRIAL APPLICABILITY

The present invention can be used to a head-up display apparatus using AR.

EXPLANATION OF REFERENCE CHARACTERS

1 . . . AR-HUD, 2 . . . vehicle, 3 . . . windshield, 4 . . . vehicle information, 5 . . . driver, 6 . . . display region, 10 . . . vehicle information acquisition unit, 20 . . . controller, 21 . . . ECU, 22 . . . audio output unit, 23 . . . non-volatile memory, 24 . . . memory, 25 . . . light source adjusting unit, 26 . . . distortion correction unit, 27 . . . display element driver, 28 . . . display distance adjusting unit, 29 . . . mirror adjusting unit, 30 . . . video image display, 30a . . . projector, 30b . . . LCD, 31 . . . light source, 32 . . . illumination optical system, 33 . . . display element, 35, 35-1, 35-2, 35-3 . . . HUD display region, 40 . . . display distance adjusting mechanism, 41a . . . diffuser, 41b . . . diffuser, 41c . . . movable diffuser, 42a . . . lens, 42b . . . movable lens, 43a . . . movable optical filter, 43b . . . comb-like optical filter, 50 . . . mirror driver, 51 . . . mirror, 51a . . . mirror, 51b . . . light control mirror, 52 . . . mirror, 60 . . . speaker, 101 . . . vehicle speed sensor, 102 . . . shift position sensor, 103 . . . handle steering angle sensor, 104 . . . headlight sensor, 105 . . . illuminance sensor, 106 . . . chromaticity sensor, 107 . . . distance measuring sensor, 108 . . . infrared ray sensor, 109 . . . engine start sensor, 110 . . . acceleration sensor, 111 . . . gyro sensor, 112 . . . temperature sensor, 113 . . . road-to-vehicle communication wireless receiver, 114 . . . vehicle-to-vehicle communication wireless receiver, 115 . . . camera (inside the vehicle), 116 . . . camera (outside the vehicle), 117 . . . GPS receiver, 118 . . . VICS receiver, 281 . . . functional liquid crystal film ON/OFF controller, 282 . . . lens movable unit, 283 . . . light control mirror ON/OFF controller, 284 . . . diffuser movable unit, 285 . . . optical filter movable unit, 401 . . . functional liquid crystal film, 402 . . . lens movable mechanism, 403 . . . light control mirror, 404 . . . diffuser movable mechanism, 405 . . . optical filter movable mechanism.

The invention claimed is:

1. A head-up display apparatus displaying a virtual image to be overlapped with scenery in front of a vehicle with respect to a driver by projecting a video image onto a windshield of the vehicle, the head-up display apparatus comprising:
   a vehicle information acquisition unit configured to acquire various kinds of vehicle information which can be detected by the vehicle;
   a controller configured to control display of the video image based on the vehicle information acquired by the vehicle information acquisition unit;
   a video image display configured to form the video image based on an instruction from the controller;
   a mirror configured to reflect the video image formed by the video image display to project onto the windshield;
   a mirror driver configured to change an angle of the mirror based on an instruction from the controller; and
   a display distance adjusting mechanism configured to adjust display distances of the virtual image to be different for different display areas on the windshield with respect to the driver,
   wherein the controller adjusts the angle of the mirror via the mirror driver based on the vehicle information such that the virtual image can be displayed with respect to the driver to be overlapped with the scenery,
   wherein the vehicle information includes brightness of an outside of the vehicle and information on a running road, and
   wherein the controller adjusts a display position of the virtual image based on a maximum display distance set by the information so as to display such that the virtual image is fitted to and overlapped with a focus which the driver sees.

2. The head-up display apparatus according to claim 1, wherein the controller:
acquires information relating to a first grade of a forward road as the vehicle information from the vehicle information acquisition unit, and information relating to a second grade of a road of a current place;
adjusts, when the first grade is larger than the second grade by a predetermined threshold value or more, the angle of the mirror via the mirror driver such that a display position of the virtual image moves in an upward direction; and
adjusts, when the second grade is larger than the first grade by a predetermined threshold value or more, the angle of the mirror via the mirror driver such that the display position of the virtual image moves in a downward direction.

3. The head-up display apparatus according to claim 2, wherein the controller adjusts the angle of the mirror via the mirror driver only when a state in which the first grade is larger than the second grade by the predetermined threshold value or more, or a state in which the second grade is larger than the first grade by the predetermined threshold value or more, continues for a predetermined period of time or more.

4. The head-up display apparatus according to claim 1, wherein the controller:
acquires information relating to a speed of the vehicle as the vehicle information from the vehicle information acquisition unit; and
adjusts, when the speed is larger than a predetermined threshold value, the angle of the mirror via the mirror driver such that a display position of the virtual image moves in an upward direction.

5. The head-up display apparatus according to claim 1, wherein the controller:
acquires information relating to a height position of eyes of the driver as the vehicle information from the vehicle information acquisition unit;
adjusts, when the height position is higher than a predetermined threshold value, the angle of the mirror via the mirror driver such that a display position of the virtual image moves in an upward direction; and
adjusts, when the height position is lower than the predetermined threshold value, the angle of the mirror via the mirror driver such that the display position of the virtual image moves in a downward direction.

6. The head-up display apparatus according to claim 1, wherein the controller:
acquires information relating to a vibration amount of the vehicle as the vehicle information from the vehicle information acquisition unit; and
offsets the video image in a display region of the video image in accordance with the vibration amount.

7. The head-up display apparatus according to claim 1, wherein the controller adjusts a display position of the virtual image based on the vehicle information so as to display such that the virtual image is fitted to and overlapped with a focus which the driver sees.

8. The head-up display apparatus according to claim 7, wherein the controller acquires vergence angle information, and adjusts the display position of the virtual image in accordance with vergence angle based on the vergence angle information so as to display such that the virtual image is fitted to and overlapped with the focus which the driver sees.

9. The head-up display apparatus according to claim 1, wherein the controller acquires eye point information, and adjusts a display position where the virtual image is displayed to be overlapped with the scenery based on a relation between an eye point based on the eye point information and a distance from the eye point to a road surface.

10. The head-up display apparatus according to claim 9, wherein the controller continuously changes a height of the display position from the road surface where the virtual image is displayed, in proportion to the distance from the eye point to the road surface, and displays the virtual image to be overlapped with the scenery.

11. The head-up display apparatus according to claim 9, wherein the controller changes a height of the display position from the road surface where the virtual image is displayed, to a different height corresponding to the distance from the eye point to the road surface, and displays the virtual image to be overlapped with the scenery.

* * * * *